United States Patent [19]

Kito et al.

[11] Patent Number: 5,585,425
[45] Date of Patent: Dec. 17, 1996

[54] THERMOCHROMIC OPAQUE/TRANSPARENT COMPOSITION, LAMINATE MEMBER EMPLOYING THE SAME, AND THREE-DIMENSIONAL MEMBER EMPLOYING SAID LAMINATE MEMBER AND CAPABLE OF CONCEALING AND REVEALING THE INTERIOR

[75] Inventors: Tsutomu Kito, Tajimi; Kuniyuki Senga, Kasugai; Hiroyuki Hayashi, Gifu-ken, all of Japan

[73] Assignee: The Pilot Ink Co., Ltd., Nagoya, Japan

[21] Appl. No.: 409,057

[22] Filed: Mar. 23, 1995

[30] Foreign Application Priority Data

Mar. 25, 1994 [JP] Japan .................................. 6-079331

[51] Int. Cl.$^6$ ........................................................ C08K 5/13
[52] U.S. Cl. .......................... 524/324; 524/343; 428/520; 428/522
[58] Field of Search .............................. 524/99, 523, 567, 524/324, 343; 428/520, 522

[56] References Cited

U.S. PATENT DOCUMENTS

| | | | |
|---|---|---|---|
| 4,221,700 | 9/1980 | Minagawa et al. | 524/128 |
| 4,421,560 | 12/1983 | Kito et al. | 106/21 |
| 5,490,956 | 2/1996 | Kito et al. | 252/583 |

FOREIGN PATENT DOCUMENTS

| | | |
|---|---|---|
| 0523888 | 1/1993 | European Pat. Off. . |
| 0526019 | 2/1993 | European Pat. Off. . |
| 0595577 | 5/1994 | European Pat. Off. . |

*Primary Examiner*—Jeffrey T. Smith
*Attorney, Agent, or Firm*—Fitzpatrick, Cella, Harper & Scinto

[57] ABSTRACT

A thermochromic opaque/transparent composition is capable of exhibiting change in transparency together with change in color in response to temperature variation, a laminate member employing the same, and a three-dimensional article capable of concealing and revealing the interior, utilizing the laminate member. A thermochromic opaque/transparent composition is composed of dispersion, in vinyl chloridevinyl acetate copolymer matric resin, which has been obtained by blending with hindered amine compound selected from piperidine derivatives within a particle size range of 0.1 to 2.0 μm, of a reversible thermochromic material consisting of (a) an electron-donating color-developing organic compound, (b) a compound having a phenolic hydroxyl radical, and (c) a homogeneous fused composition containing a compound selected from alcohols, esters, ketones and carboxylic acids, and capable of exhibiting reversible change in transparency together with change in color in response to temperature variation, with hysteresis with a temperature difference of 10° C. to 50° C. between the low and high trigger temperatures.

14 Claims, 14 Drawing Sheets

THERMOCHROMIC OPAQUE/TRANSPARENT COMPOSITION, LAMINATE MEMBER EMPLOYING THE SAME, AND THREE-DIMENSIONAL MEMBER EMPLOYING SAID LAMINATE MEMBER AND CAPABLE OF CONCEALING AND REVEALING THE INTERIOR

BACKGROUND OF THE INVENTION

1. Field of the Invention

The present invention relates to a thermochromic opaque/transparent composition, a laminate member employing the same, and a three-dimensional member employing said laminate member and capable of concealing and revealing the interior. More particularly, the present invention relates to a thermochromic opaque/transparent composition of which transparency/opacity reversibly varies with certain hysteresis, together with color change, in response to temperature variation, a laminate member employing said composition, and a three-dimensional member employing said laminate member and capable of concealing and revealing the interior.

2. Related Background Art

In the field of thermochromic material capable of reversible color change in response to temperature variation, there is already known, as disclosed in the Japanese Patent Publication Nos. 51-44706 and 51-44707, a material effecting a color-generating reaction between an electron donating compound and a phenolic compound in the presence of a compound having an alcoholic hydroxyl radical.

Also as an application of such thermochromic material, the Japanese Patent Publication No. 51-35216 discloses a thermoplastic polymer composition comprising (a) an electron donating color-developing compound, (b) a compound having a phenolic hydroxyl radical, (c) a compound selected from alcohols, esters, ketones and ethers, and (d) thermoplastic polymer.

Such prior technologies are featured by reversible color change. Although there is described that a variation in the transparency/opacity occurs together with the color change, the mixture of the components (a), (b) and (c) in the above-mentioned invention, simply added in the thermoplastic resinous polymer has been associated with drawbacks of significant loss in the developed color density and in the sensitivity of color change due to the polar effect of said thermoplastic polymer. Also in the thermoplastic polymer composition of the above-mentioned invention, the thermoplastic materials consisting of the components (a), (b) and (c) are often liquidous already at the room temperature or at the color change, whereby there is often encountered so-called bleeding phenomenon in which one of said three components is separated on the resin surface in the initial stage after the preparation of the thermoplastic polymer composition, or after repeated color changes thereof. For these reasons it has been practically difficult to stably maintain the aforementioned three components in the thermoplastic polymer for a prolonged period, with satisfactory color changes in repeated temperature variations.

The thermochromic material of the above-explained three-component system, capable of showing color change only when three components are present together, is usually incorporated in microcapsules and protected by the microcapsule wall. As a result, said material is rendered stable against the external chemical or thermal actions and applicable to various purposes.

However, said three components are converted into a kind of solid pigment by said microencapsulation, and, when such microencapsulated pigment is dispersed in vehicle resin, transparency thereof is significantly lowered by the surfacial light scattering specific to the pigment even if the vehicle resin itself is transparent. Such vehicle layer is capable of concealing and revealing an underlying picture when it is practically adhered to said vehicle layer, but such underlying picture cannot be viewed through the microcapsule-containing vehicle layer if said picture is separated therefrom by a certain distance.

Thus, in case the conventional three-component thermochromic material is directly incorporated in the resin without microencapsulation, it has been practically difficult to obtain a composition which clearly reveals the interior of a three-dimensional object, with satisfactory color change, in response to temperature variation in stable manner.

On the other hand, a composition capable of causing a change in transparency/opacity is disclosed in the U.S. Pat. No. 4,268,413. Said composition is composed of an organic substance and an optically transparent polymer material and has temperature-dependent light absorption, in which the refractive index of said organic substance coincides with that of the polymer material according to temperature variation, thereby reversibly inducing a change in transparence/opacity.

The above-mentioned composition reversibly repeats the change between transparent and opaque states according to temperature variation. Basically the transparent state is colorless, and the opaque state is white. It is basically unable to show a change in the hue, for example between blue and pink. Also said optically transparent polymer material is determined by the relation with the organic substance in refractive indexes thereof, namely by the physical factor only, and does not involve a change in the hue.

SUMMARY OF THE INVENTION

The present invention is to provide a novel thermochromic opaque/transparent composition capable of stably and reversibly exhibiting generation and extinguishing of color and change between transparent and opaque states by an electron donating-accepting reaction, which cannot be realized in the aforementioned thermoplastic composition or opaque material utilizing the conventional thermochromic material, and also to provide a laminate member employing said novel composition and a three-dimensional article employing said laminate member.

In the course of investigations to reach the thermochromic opaque/transparent composition of the present invention, the present inventors have noticed the usefulness if the aforementioned reversible thermochromic material of three components can be stably maintained in vinyl chloride-vinyl acetate copolymer resin without microencapsulation.

As a result, the thermochromic opaque/transparent composition capable of extremely stably maintaining said three components has been developed, based on a finding that the reversible thermochromic material consisting of said three components exists extremely stably in repeated heating/cooling cycles when said three components are dispersed, in mutually uniformly dissolved state, as small particles in vinyl chloride-vinyl acetate copolymer resin, and a novel finding beyond expectation that such dispersion in small particles results in significant hysteresis in the color change and in the accompanying change in transparency.

Conventionally, in order to obtain significant hysteresis in thermochromism, there has been required a compound of a special structure or a special thermal property in the component (c), and the extent of such hysteresis has been limited, as disclosed in the Japanese Patent Publication No. 4-17154. The present invention realizes significant hysteresis in the thermal property of the component (c) itself, or in the change in color and in transparency of the thermochromic material consisting of the aforementioned three components (a), (b) and (c), without relying solely on the thermal property of said component (c) but by the effect of fine particle formation. Based on these findings, the present inventors have completed the thermochromic opaque/transparent composition capable of exhibiting stable hysteresis even in repeated cycles, without microencapsulation of the three-component thermochromic material, and also without the conventional loss in color density and in sensitivity of color change in such three-component thermochromic system.

The present invention relates to a thermochromic opaque/transparent composition, a laminate member employing the same, and a three-dimensional article capable of concealing or revealing the interior, utilizing said laminate member.

At first there will be explained said thermochromic opaque/transparent composition of the present invention.

Said composition is composed of dispersion, in vinyl chloride-vinyl acetate copolymer vehicle resin, which has been obtained by blending with hindered amine compound selected from piperidine derivatives within a particle size range of 0.1 to 2.0 µm, of a reversible thermochromic material consisting of (a) an electron-donating color-developing organic compound, (b) a compound having a phenolic hydroxyl radical, and (c) a homogeneous fused composition containing a compound selected from alcohols, esters, ketones and carboxylic acids, and is featured by a change in transparency together with a change in color depending on the temperature variation, with hysteresis with a difference in the trigger temperatures of high and low temperature sides of 10° C. to 50° C.

The reversible thermochromic opaque/transparent composition of the present invention has a low trigger temperature and a high trigger temperature, and undergoes a basic change of being colored and opaque below said low trigger temperature, and colorless and transparent above said high trigger temperature.

Said trigger temperature means a temperature where a "change" occurs in the color and/or transparency.

A first feature of the present invention lies in a fact that the above-mentioned three components are dispersed, in a mutually dissolved uniform state, stably as small particles in vinyl chloride-vinyl acetate copolymer vehicle resin so as to be capable of withstanding repeated changes. More specifically, if the three-component thermochromic material is dispersed as particles with a diameter within a range of 0.1 to 2.0 µm, preferably 0.2 to 1.5 µm, said particles are extremely stably maintained in the vinyl chloride-vinyl acetate copolymer vehicle resin, while repeating liquid/solid changes in the heating/cooling cycles. In this respect, the vinyl chloride-vinyl acetate copolymer resin plays an important and effective role in the dispersibility of the three-component thermochromic material. The present inventors estimate that the particles of said three-component thermochromic material can stably exist inside the resin as they are more stabilized, within a particle size range of 0.1 to 2.0 µm, in terms of free energy. Above about 2 µm, said material tends to bleed to the resin surface by repeated heating/cooling cycles. The particles of a larger diameter tend to become unstable in the matrix resin, because of increased free energy. On the other hand, at a particle diameter below 0.1 µm, the opacity below the low trigger temperature is lost because the visible light can be transmitted. Thus, because of the increased translucency, there cannot be obtained a satisfactory change between the transparent and opaque states. A second feature of the present invention lies in a fact that the dispersion of said three components as small particles in the vehicle resin provides a particular effect in the change of color and transparency. More specifically, such dispersion has a low trigger temperature and a high trigger temperature, and is colored and opaque below said low trigger temperature and colorless and transparent above said high trigger temperature, wherein the difference between said two trigger temperatures is about 10° C. to 50° C., exhibiting very clear hysteresis.

In the course of investigation for the physical property of aforementioned component (c), the present inventors have obtained a finding that the melting point of such component is almost uniquely determined by the compound itself, while the solidifying point (or cloud point) varies significantly by the collective amount of the compound, or, the capacity thereof. More specifically, the solidifying point (or cloud point) of a compound becomes lower as the collective amount thereof becomes less, for example in the stepwise order when said compound is present by an amount of 30 ml. In a beaker of 50 ml., when it is sealed with a length of 1 mm in a capillary with an internal diameter of 1 mm, and when it is present as a small particle of 0.5 µm. In further details, the solidifying point is governed by the crystal nucleation rate and the crystal growth rate, and the crystal growth becomes difficult when the particle diameter of compound becomes smaller than about 2 µm because of the reduced crystal nucleation. As a result, solidification does not start unless the compound is cooled to a lower temperature. In particular, a significant change in the solidifying point can be observed around a particle size of 2 µm.

Furthermore, in order to satisfactorily realize the aforementioned effect of the present invention, the particles should preferably be present in substantially independent state. Said particles, if present in a clustered or coagulated form or in a state involving precipitation in the interior or at the surface, show a local or overall variation of the solidifying point. Such particles are not only unable to exhibit a sharp state change but also unable to stay stably in the vehicle resin, thus leading to bleeding phenomenon and resulting in unsatisfactory stability. The present inventors have succeeded in shifting the low trigger temperature significantly to the lower temperature side, by dispersing the aforementioned three-component thermochromic material in single particles, with a particle size of 0.1 to 2.0 µm, in vinyl chloride-vinyl acetate copolymer vehicle resin. At the same time the change in transparency/opacity occurs, whereby unique hysteresis can be realized. The width of hysteresis of the thermochromic opaque/transparent composition of the present invention is about 10° C. to 50° C.

In the following there will be given an explanation on the vehicle or matrix resin.

As already mentioned before, the three-component thermochromic material is susceptible to external chemical influences, and the matrix resin may exert such influence.

For example, 100% polyvinyl chloride resin tends to generate hydrogen chloride by gradual dechlorination reaction even in the ordinary storage condition, thereby inducing irreversible color generation of the electron-donating color-developing organic compound. Also 100% polyvinyl acetate resin strongly desensitizes the three-component thermochromic material by the strong polarity of vinyl acetate radical, whereby the thermochromic property is almost lost. For these reasons, either resin in single state is unsuitable as the matrix resin of the present invention. On the other hand, copolymer of vinyl chloride and vinyl acetate with a suitable monomer ratio is not only practically free from dechlorination reaction but also provides the three-component thermochromic material with a satisfactory atmosphere which is practically free from the desensitizing effect of polyvinyl acetate resin. Vinyl chloride-vinyl acetate copolymer resin is selected as the matrix resin for such absence of irreversible color generation and practical absence of desensitization. Also hydrocarbon resins of smaller polarity and halogen-containing resins do not have the permanent desensitization effect and the strong color generating effect mentioned above, but such resins dissolve or mutually dissolve with the three-component thermochromic material in unlocalized state, instead of dispersed state. As a result, said material, being diffused in the matrix resin, significantly loses the thermochromic effect and also tends to lose the change between the transparent and opaque states. Stated differently, excellent thermochromic property and change in transparency of the three-component thermochromic material can be obtained when it is dispersed as small particles in the matrix resin.

Also in case of mutual dissolution, the compounds tend to bleed in the initial stage of preparation or with the lapse of time and are therefore extremely unstable. For these reasons, dispersion in small particles is an important factor in the present invention. Consequently the composition of the present invention is completely different from a composition in which the organic compound alone is dispersed in the matrix resin to induce a change in the transparency in response to a temperature variation, and the matrix resin assumes the following composition in order to realize the changes in color and transparency.

The matrix resin to be employed in the present invention is assumed to be practically transparent optically, and, for such resin, there is employed vinyl chloride-vinyl acetate copolymer resin having an average molecular weight within a range from 7,000 to 50,000 and a monomer weight ratio with vinyl chloride from 60 to 92% and vinyl acetate from 8 to 40%.

Other monomer components, for example hydroxyl radicals, may be present with a monomer ratio not exceeding 7 wt. %. However, carboxyl radicals are excluded because they induce irreversible color generation. Also another mutually soluble resin may be mixed, with a weight ratio not exceeding 30%, to the vinyl chloride-vinyl acetate copolymer resin. Such minor resin component is employed for example for providing adhesive property at the secondary working, improving the film strength etc. within an extent not affecting the basic functions of the present invention, namely changes in color and transparency in response to temperature variation.

Examples of such other mutually soluble resin include denatured alkyd resin, unsaturated polyester resin, saturated polyester resin, epoxy resin, amino resin, polyurethane resin, oil-soluble cellulose resin, hydrocarbon resin, vinyl acetate resin, butyral resin, acrylic resin, methyl methacrylate resin, styrene-butadiene copolymer resin, ethylene-vinyl acetate copolymer resin, chlorinated polypropylene resin, polyamide resin, styrene resin, acrylate-styrene copolymer resin, styrene-maleic acid copolymer resin, chlorinated rubber, silicone resin, vinyl chloride-acrylate copolymer resin and ketone resin.

The electron donating color-developing organic compound to be employed in the present invention is composed of so-called leuco dye, capable of developing color by a compound having a phenolic hydroxyl radical, and selected from diphenylmethane phthalides, fluoranes, diphenylmethane azaphthalides, indolyl phthalides, phenylindolyl phthalides, phenylindolyl azaphthalides and styrylquinolines.

Examples of such organic compound include 3,3-bis(p-dimethylaminophenyl)-6-dimethylaminophthalide, 3-(4-diethylaminophenyl)-3-(1-ethyl-2-methylindol-3-yl) phthalide, 3-(4-diethylamino-2-ethoxyphenyl)-3-1-ethyl-2-methylindol-3-yl)-4-azaphthalide, 1,3-dimethyl-6-diethylaminofluorane, 2-chloro-3-methyl-6-dimethylaminofluorane, 3-dibutylamino-6-methyl-7-anilinofluorane, 3-diethylamino-6-methyl-7-anilinofluorane, 3-diethylamino-6-methyl-7-xylindinofluorane, 2-(2-chloroanilino)-6-dibutylaminofluorane, 3,6-dimethoxyfluorane, 3,6-di-n-butoxyfluorane, 1,2-benz-6-diethylaminofluorane, 1,2-benz-6-dibutylaminofluorane, 1,2-benz-6-ethylisoamylaminofluorane, 2-methyl-6-(N-p-tolyl-N-ethylamino)fluorane, 2-(N-phenyl-N-methylamino)-6-(N-p-tolyl-ethylamino)fluorane, 2-(3'-trifluoromethylanilino)-6-diethylaminofluorane, 3-chloro-6-cyclohexylaminofluorane, 2-methyl-6-cyclohexylaminofluorane and 3-methoxy-4-dodecoxystyrylquinoline.

The compound having a phenolic hydroxyl radical can be monohydric, dihydric or polyhydric phenol, eventually having alkyl, aryl, acyl, alkoxycarbonyl, carboxyl or ester thereof, or amido radical or a halogen atom as the substituent of the benzene ring, or can be bis- or trisphenol. Examples of such phenolic compound capable of developing color in the electro-donating color-developing organic compound include phenol, o-cresol, tert-butylphenol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, n-dodecyl p-hydroxybenzoate, resorcin, dodecyl gallate, 2,2-bis(4'-hydroxyphenyl)propane, 4,4'-dihydroxydiphenylsulfone, 1,1-bis(4-hydroxyphenyl)ethane, 2,2-bis(4'-hydroxy-3-methylphenyl)propane, bis(4'-hydroxyphenyl)methane, bis(4-hydroxyphenyl)sulfide, 1-phenyl-1,1-bis(4'-hydroxyphenyl)ethane, 1,1-bis(4'-hydroxyphenyl)-3-methylbutane, 2,2-bis(4'-hydroxyphenyl)butane, 2,2-bis(4'-hydroxylphenyl)ethyl propionate, 2,2-bis(4'-hydroxyphenyl)-4-mehylpentane, 1,1-bis(4'-hydroxyphenyl)-2-methylpropane, 2,2-thiobis(6-tert-butyl-3-methylphenol), 2,2-bis(4'-hydroxyphenyl) hexafluoropropane, 1,1-(4'-hydroxyphenyl)n-hexane, 1,1-bis(4'-hydroxyphenyl)n-heptane, 1,1-bis(4'-hydroxyphenyl)n-octane, 1,1-bis(4'-hydroxyphenyl)n-nonane, 1,1-bis(4'-hydroxyphenyl)n-decane, 1,1-bis(4'-hydroxyphenyl)n-dodecane, 2,2-bis(4'-hydroxyphenyl)n-heptane, and 2,2-bis(4'-hydroxyphenyl)n-nonane.

In general, the phenolic compound has a relatively high polarity, because of the phenolic hydroxyl radical thereof, and is therefore poorly soluble in the component (c) of low polarity.

In the three-component thermochromic material dispersed in the matrix resin, such poor solubility tends to cause precipitation of separation of the phenolic compound and the component (c), thus resulting in bleeding or hindering satisfactory reversible color change.

For this reason, a phenolic compound, represented by the following general formula is preferably employed as 100 wt. %, or at least 50 wt. % of the component having phenolic hydroxyl radical. The compound of the following general formula is particularly preferable as the phenolic compound showing satisfactory solubility in said component (c):

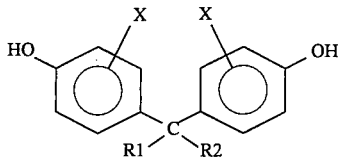

wherein R1 stands for H or $CH_3$; R2 stands for $C_nH_{2n+1}$ (4<n<11) which is a straight- or branched-chain alkyl radical; or R1=R2=$CF_3$; and X stands for a substituent on aromatic ring which is H or $CH_3$.

Non-limitative examples of the compound of the foregoing general formula include 1,1-bis(4-hydroxyphenyl)-4-methylbutane, 1,1-bis(4'-hydroxyphenyl)n-pentane, 1,1-bis(4'-hydroxyphenyl)n-hexane, 1,1-bis(4'-hydroxyphenyl)n-heptane, 1,1-bis(4'-hydroxyphenyl)n-octane, 1,1-bis(4'-hydroxyphenyl)n-nonane, 1,1-bis(4'-hydroxyphenyl)n-dodecane, 2,2-bis-(4'-hydroxyphenyl)n-heptane, 2,2-bis(4-hydroxyphenyl) n-nonane, 1,1-bis(3'-methyl-4'-hydroxyphenyl)n-hexane, and 2,2-bis(4'-hydroxyphenyl)-hexafluoropropane.

Alcohols to be employed in the present invention are saturated aliphatic monohydric alcohols with ten or more carbon atoms. Examples of such alcohols include decane-1-ol, undecane-1-ol, lauryl alcohol, tridecane-1-ol, myristyl alcohol, pentadecane-1-ol, cetyl alcohol, heptadecane-1-ol, stearyl alcohol, octadecane-2-ol, eicosane-1-ol, docosane-1-ol, and 6-(perfluoro-7-methyloctyl)hexanol.

Esters employable in the present invention can be classified into following four categories (a)–(d):

(a) an ester consisting of a monobasic aliphatic acid and an aliphatic or alicyclic monohydric alcohol and having 10 or more carbon atoms in total;

(b) a polybasic acid ester consisting of a bi-or polybasic carboxylic acid and an aliphatic or alicyclic monohydric alcohol and having 28 or more carbon atoms in total;

(c) an ester consisting of an aliphatic di- or polyhydric alcohol and a monobasic aliphatic acid and having 26 or more carbon atoms in total; and (d) an ester consisting of an aromatic dihydric alcohol and a monobasic fatty acid and having 28 or more carbon atoms in total.

In the following there are shown examples of the esters (a), consisting of a monobasic fatty acid and an aliphatic or alicyclic monohydric alcohol and having 10 or more carbon atoms in total. Esters with 9 or less carbon atoms in total scarcely provide opacity even below the low trigger temperature, because such esters are mutually soluble with the matrix resin due to the increased polarity of the molecule. Also esters containing aromatic ring are very poor in providing opacity.

Examples of said ester (a) include ethyl caprylate, n-butyl caprylate, n-octyl caprylate, lauryl caprylate, cetyl caprylate, stearyl caprylate, n-butyl caprate, n-hexyl caprate, myristyl caprate, docosyl caprate, methyl laurate, 2-ethylhexyl laurate, n-decyl laurate, stearyl laurate, ethyl myristate, 3-methylbutyl myristate, 2-methylpentyl myristate, n-decyl myristate, cetyl myristate, stearyl myristate, isopropyl palmirate, neopentyl palmirate, n-nonyl palmitate, n-undecyl palmitate, lauryl palmitate, myristyl palmirate, cetyl palmirate, stearyl palmitate, cyclohexyl palmitate, cyclohexylmethyl palmitate, methyl stearate, ethyl stearate, n-propyl stearate, n-butyl stearate, n-amyl stearate, 2-methylbutyl stearate, n-hexyl stearate, n-heptyl stearate, 3,5,5-trimethylhexyl stearate, n-octyl stearate, 2-ethylhexyl stearate, n-nonyl stearate, n-decyl stearate, n-undecyl stearate, lauryl stearate, n-tridecyl stearate, myristyl stearate, n-pentadecyl stearate, cetyl stearate, stearyl stearate, eicosyl stearate, n-docosyl stearate, cyclohexyl stearate, cyclohexylmethyl stearate, oleyl stearate, isostearyl stearate, n-butyl 12-hydroxystearate, n-methyl behenate, n-ethyl behenate, n-propyl behenate, isopropyl behenate, n-butyl behenate, isobutyl behenate, 2-methylbutyl behenate, n-amyl behenate, neopentyl behenate, n-hexyl behenate, 2-methylpentyl behenate, n-heptyl behenate, 2-ethylhexyl behenate, n-nonyl behenate, myristyl behenate, n-undecyl behenate, lauryl behenate, n-tridecyl behenate, myristyl behenate, n-pentadecyl behenate, cetyl behenate, stearyl behenate, and behenyl behenate.

In the following there are shown examples of the polybasic acid esters (b), consisting of an aliphatic di- or polybasic carboxylic acid and an aliphatic or alicyclic monohydric alcohol and having 28 or more carbon atoms in total.

Esters with 27 or less carbon atoms in total do not provide opacity even below the low trigger temperature, since such esters are mutually soluble with the matrix resin due to the increased polarity of the molecule. Also esters containing aromatic ring do not provide opacity.

Examples of such esters include dimyristyl oxalate, dicetyl oxalate, dilauryl malonate, dicetyl malonate, distearyl malonate, dilauryl succinate, dimyristyl succinate, dicetyl succinate, distearyl succinate, dilauryl glutarate, diundecyl adipate, dilauryl adipate, di-n-tridecyl adipate, dimyristyl adipate, dicetyl adipate, distearyl adipate, di-n-docosyl adipate, di-n-decyl azelate, dilauryl azelate, di-n-tridecyl azelate, di-n-nonyl sebacate, dimyristyl sebacate, distearyl sebacate, di-n-pentyl 1,18-octadecylmethylenecarboxylate, di-n-octyl 1,18-octadecylmethylenecarboxylate, di-(cyclohexylmethyl) 1,18-octadecylmethylenecarboxylate, and di-neopentyl 1,18-octadecylmethylenecarboxylate.

In the following there are shown examples of the esters (c), consisting of an aliphatic or alicyclic di- or polyhydric alcohol and a monobasic fatty acid and having 26 or more carbon atoms in total.

Said examples include ethyleneglycol dimyristate, ethyleneglycol dipalmitate, ethyleneglycol distearate, propyleneglycol dilaurate, propyleneglycol dimyristate, propyleneglycol dipalmitate, butyleneglycol distearate, hexyleneglycol dilaurate, hexyleneglycol dimyristate, hexyleneglycol dipalmitate, hexyleneglycol distearate, 1,5-pentanediol distearate, 1,2,6-hexanetriol dimyristate, pentaerythritol trimyristate, pentaerythritol tetralaurate, 1,4-cyclohexanediol didecyl, 1,4-cyclohexanediol dimyristyl, 1,4-cyclohexanedimethanol dilaurate, and 1,4-cyclohexanedimethanol dimyristate.

In the following there are shown examples of the esters (d), consisting of an aromatic dihydric alcohol and a monobasic fatty acid and having 28 or more carbon atoms in total.

Said examples include xyleneglycol dicaprinate, xyleneglycol di-n-undecanate, xyleneglycol dilaurate, xyleneglycol dimyristate, xyleneglycol dipalmitate, and xyleneglycol distearate.

Ketones to be employed in this invention are those having 10 or more carbon atoms, and examples of such ketones include decane-2-one, undecane-2-one, laurone and stearone.

Carboxylic acids to be employed in this invention are higher fatty acids having 12 or more carbon atoms, and examples of such acids include lauric acid, myristic acid, palmitic acid, stearic acid and behenic acid.

The component (c) is composed of one or more compounds selected from the above-mentioned alcohols, esters, ketones and carboxylic acids. The combined use of plural compounds provides an advantage of increased freedom in setting the trigger temperatures for causing changes in color and transparency.

Then, as a condition for inducing changes in color and transparency in response to a temperature variation, the ratio of the three-component thermochromic material with respect to the matrix resin is an important factor in the determination of the density in the transparent/opaque change and in the color change.

For example, when the electron-donating color-developing compound (a) and the phenolic compound (b) are respectively used with 3.3 and 13 parts by weight in 100 parts by weight of the matrix resin, stearyl caprate with 28 carbon atoms as the component (c) in an amount of 5 parts by weight provides very low opacity below the low trigger temperature. On the other hand, if said component (c) is used in an amount of 116 parts by weight, the opacity below the low-trigger temperature increases significantly but the transparency above the high trigger temperature is reduced so that the composition is practically no longer transparent. For this reason, in order to attain thermochromic change together with color change with a satisfactory contrast, the ratio of addition of the three-component thermochromic material is limited, with respect to 100 parts by weight of vinyl chloride-vinyl acetate copolymer resin, 0.8–33 parts by weight of the electron-donating color-developing organic compound (a), 1.6–50 parts by weight of the compound (b) with phenolic hydroxyl radical, and 8–83 parts by weight of said compound (c).

A more preferable range of addition is, with respect to 100 parts by weight of vinyl chloride-vinyl acetate copolymer resin, 1.7–83 parts by weight of the organic compound (a), 3.3–20 parts by weight of the compound (b) with phenolic hydroxyl radical, and 17–50 parts by weight of the component (c).

Further according to the present invention, with respect to 100 parts by weight of the vinyl chloride-vinyl acetate resin, 0.1 to 10 parts by weight, preferably 0.5 to 5 parts by weight of the hindered amine compound selected from the piperidine derivatives are blended.

The vinyl chloride-vinyl acetate copolymer resin is effective, as described previously, as a satisfactory matrix for a thermochromic material which is not only free from dechlorination reaction of vinyl chloride resin but also practically free from the desensitizing effect of polyvinyl acetate resin. In the storage at room temperature for a long period of time (2 to 3 months) or the storage at 50° C. or higher for a week or more, an extremely small amount of hydrogen chloride produced from the polyvinyl chloride monomer system tends to cause a color-developing reaction with leuco dye, and cause irreversible color generation, i.e., remaining color in the uncolored state. However, by blending with the hindered amine compound, the aforesaid defect can be eliminated.

The blending with the compound can stably continue the initial color change characteristics thermally with the lapse of time without practically changing the temperature-color density curve in the non-added system in the initial state.

Conventionally, as means for restraining the occurrence of hydrogen chloride based on free chlorine atoms caused by thermal factor from the polyvinyl chloride monomer system, various stabilizers are known. The conventional additives were used to simply restrain thermal decomposition of resin.

In the present invention, the occurrence of hydrogen chloride further causes a sensitive color-developing reaction with leuco dye, leading to the occurrence of irreversible remaining color. In order to prevent this occurrence, the conventional simple means for restraining decomposition and deterioration should be improved to obtain better effect.

As conventional stabilizers for polyvinyl chloride, there are known phosphate, epoxidized ester, fatty metallic salt, organotin sulfur compound, lead compound, and hindered phenols. Since, however, phosphate and epoxidized ester noticeably affect the sensitivity of color change adversely, they deteriorate the function of thermochromic material. Further, if the composition of the present invention is stored in the colored state, the aforesaid components (a) and (b) and these additives locally fusion bond, and as a result, it becomes difficult to extinguish the color.

On the other hand, since organotin sulfur compound and lead compound contain heavy metals, their uses are limited from the viewpoint of safety, and they have a great drawback that irreversible color generation is caused from the beginning of addition.

In addition, fatty metallic salt actually could not restrain the reaction of hydrogen chloride produced by thermal decomposition of leuco dye and resin.

The present inventors studied to prevent the irreversible color generation which is caused by hydrogen chloride produced from the leuco dye and vinyl chloride-vinyl acetate copolymer resin, and as a result, proved the hindered amine compound to be most effective. They completed the present invention by finding that the compound meets all the requirements: not adversely affecting the thermochromic characteristics, that is, not impairing the sensitivity of color change, not lowering the developed color density, maintaining the satisfactory color extinguishing capacity, and the like.

Examples of the aforesaid hindered amine compounds include poly<<6-(N-morpholine)-1,3,5-triazine-2,4-diyl><(2,2,6,6-tetramethyl-4-piperidil) imino>hexamethylene<(2,2,6,6-tetramethyl-4-piperidil)imino>>(trade name: SMISOLVE 500, manufactured by Sumitomo Chemical Co., Ltd.), 1,2,3,4-butanetetracarboxylic acid tetra(2,2,6,6-tetramethyl-4-piperidil) (manufactured by Adeca Argus Co., Ltd.), poly<<6-(1,1,3, 3-tetramethylbutyl) imino-1,3,5-triazine-2,4-diyl><(2,2,6,6-tetramethyl-4-piperidil) imino>hexamethylene<(2,2,6,6-tetrametyl-4-piperidil)imino<<(trade name: Tinuvin 944-LD, manufactured by Ciba-Geigy), dimethyl succinate-1-(2-hydroxyethyl)-4-hydroxy-2,2,6,6-tetramethylpiperidine polycondensate (Tinuvin 622LD, manufactured by Ciba-Geigy), 2-(3,5-di-t-butyl-4-hydroxybenzyl)-2-n-butyl malonic acid bis(1,2,2,6,6-pentamethyl-4-piperidil) (Tinuvin 144, manufactured by Ciba-Geigy), N,N-bis(3-aminopropyl)ethylenediamine-2, 4-bis<N-butyl-N-(1,2,2,6,6-pentametyl-4-piperidil)amino>-6-chloro-1,3,5-triazine condensate, bis(2,2,6,6-tetramethyl-4-piperidil) sebacate (trade name: SANOL LS770, manufactured by Sankyo), bis(N-methyl-2,2,6,6-tetramethyl-4-piperidil) sebacate (trade name: SANOL LS292, manufactured by Sankyo), 4-benzoyloxy-2,2,6,6-tetramethyl-4-piperidine (trade name: SANOL LS-744, manufactured by Sankyo), 8-acetyl-3-dodecyl-7,7,9,9-tetramethyl-1,3,8-triazaspiro<4.5>decane-2, 4-dion (SANOL LS-440, manufactured by Sankyo), 1-<2-<3-(3, 5-di-t-butyl-4-hydroxyphenyl) propyonyloxy>-2,2,6,6-tetramethylpiperidine, manufactured by Sankyo), 2,2,4,4-tetrametyl-20-(β-lauryl-oxylcarbonyl)-ethyl-7-oxa-3, 20-diazadispiro (5,1,11, 2) heneicosane-21-on (trade name: Sanduvor 3050, manufactured by Sand Co., Ltd.), <N-(2,2,6,6-tetramethyl-4-piperidil)-β-alanine>dodecylester, myristylester mixture (trade name: Sanduvor 3052, manufactured by Sand Co., Ltd.), 5-norbornane-2, 3-dicarboxylicacidbis (N-methyl-2,2, 6,6-tetramethyl-4-piperidil) ester and the like.

In the following there will be explained the method of preparing the thermochromic opaque/transparent composition of the present invention. In order to stably attain the most important feature of the present invention, namely changes in color and transparency in response to temperature variation, the reversible thermochromic material consisting of the components (a), (b) and (c) is preferably dispersed, as already explained before, in a state of particles of 0.1–2.0 µm, in the vinyl chloride-vinyl acetate copolymer resin constituting the matrix resin.

Usually the matrix resin and the above-mentioned three components are dissolved in one or more of the solvents mentioned below, and in this course, a hindered amine compound is added. In consideration of solubility of vinyl chloride-vinyl acetate copolymer resin, a ketone solvent has to be used as the rich solvent. Such solvent functions as the rich solvent also for said three components.

Examples of such ketone solvent include acetone, methylethylketone, methylisobutylketone, cyclohexanone, methylisopropylketone and methyl-n-propylketone.

Aromatic solvent, functioning as the lean solvent for the vinyl chloride-vinyl acetate copolymer resin, is preferably used in combination with said ketone solvent. Examples of such aromatic solvent include toluene and xylene.

Other usable solvents include alcohols such as isopropyl alcohol or n-butanol; esters such as n-ethyl acetate, n-propyl acetate, n-butyl acetate or isobutyl acetate; hydrocarbons such as hexane, cyclohexane, ethylcyclohexane or mineral spirit; and glycol monoalkylether.

Besides, for uniformly dispersing the mutually dissolved three components in small particles in the vinyl chloride-vinyl acetate copolymer matrix resin, the use of so-called dispersing agent is very effective. The compound with such dispersing effect generally reduces the surface tension and interfacial tension significantly, thereby dispersing the three-component thermochromic material into small separate particles in the matrix resin.

Examples of such compound include siloxane derivatives such as polyester-denatured dimethylpolysiloxane, polyether-denatured methylalkylpolysiloxane, polyester-denatured polydimethylsiloxane or polyester-denatured methylalkylpolysiloxane; fluorinated alkylesters such as Florad FC-430 or FC-431 (manufactured by Sumitomo 3M Co., Ltd.); and special polymers such as acrylonitrile-(2-methacryloyloxyethyl)-trimethylammonium-methyl sulfate-dimethylaminoethyl-methacrylate.

Such compound has the effect, in forming the thermochromic material into small particles of 0.1–2.0 µm in the matrix resin, of obtaining uniform dispersion with single nuclei, and it is particularly effective in preventing the unification and coagulation of the particles. Such additive component is used, calculated on solid content, in an amount of 0.002–0.05% with respect to 100 parts by weight of the thermochromic opaque/transparent composition, and such range is preferred in order to reduce the chemical influence to said composition.

The solution of the thermochromic opaque/transparent composition, dissolved practically uniformly in a suitable combination of the aforementioned solvents, is applied on a substrate for example by spray coating, screen printing, gravure printing, roller coating or reverse roller coating, and the solvents are completely removed by drying at room temperature or under heating. The above-mentioned three components become dispersed as small particles in the matrix resin, through the process of solvent evaporation. In order to maximize the effect of the present invention, the dispersion preferably consists of single particles as explained before. For obtaining single particles with particle size in a range of 0.1–2.0 µm, the selection of the solvents for dissolving the thermochromic opaque/transparent composition is an important factor.

More specifically, in the transient period of drying, excessively fast evaporation of solvents results in prevalent precipitation of the component (c) among said three components, and formation of a continuous phase prior to the formation of single particles, thus leading to bleeding phenomenon. Also fast evaporation of the solvents or presence of a large amount of the lean solvent induces fast precipitation of the vinyl chloride-vinyl acetate copolymer resin, thereby hindering dispersion of the thermochromic material in uniform small particles.

In general, the amount of solvents is 1–50 parts by weight, preferably 3–15 parts by weight, with respect to 1 part by weight of the thermochromic opaque/transparent composition, though said amount varies depending on the coating method.

Thickness of the thermochromic opaque/transparent composition is generally within a range of 2 to 100 µm. A thickness below said range tends to show drawbacks of insufficient stability of the particles of the composition, and difficulty in obtaining satisfactory contrast.

For uniformly applying the solution of the thermochromic opaque/transparent composition, there may be added various known additives, such as drip-preventing agent, levelling agent, defoamer, viscosifier or friction resistance improving agent. However, such additives should be so selected as to have no or minimum chemical influence to said three components and used in minimum necessary amounts.

If the formed layer of the thermochromic opaque/transparent composition is not physically smooth, not only the appearance but also the transparency above the high trigger temperature are significantly deteriorated due to the random reflection on the surface of said layer. For this reason, the surface smoothness in the formation of the layer of the thermochromic opaque/transparent composition is an important factor in achieving transparency. For this purpose there may be employed various known additives having little chemical influences and capable of providing smoothness.

Also for improving the light fastness and stability of the thermochromic opaque/transparent composition, there may be employed ultraviolet absorbing agent, antioxidant, singlet oxygen extinguisher and other similar stabilizers.

The thermochromic opaque/transparent composition of the present invention is basically colored and opaque below the low trigger temperature and colorless and transparent above the high trigger temperature, but a change between a colored (1) and opaque state and a colored (2) and transparent state is also possible by the addition of an ordinary dye or an ordinary transparent pigment. Also if the transparency is not particularly required, there may also be employed an opaque pigment.

In the following there will be explained the laminate member of the present invention.

The laminate member of the present invention is featured by a laminated structure, on a substrate, of a layer consisting of a thermochromic opaque/transparent composition which is composed of dispersion, in vinyl chloride-vinyl acetate copolymer matrix resin, which has been obtained by blending with hindered amine compound selected from piperidine derivatives within a particle size range of 0.1 to 2.0 µm, of a reversible thermochromic material consisting of (a) an electron-donating color-developing organic compound, (b) a compound having a phenolic hydroxyl radical, and (c) a homogeneous fused composition containing a compound selected from alcohols, esters, ketones and carboxylic acids and which is capable of reversible change of transparency together with change in color in response to temperature variation, with a hysteresis with a temperature difference of 10° C. to 50° C. between the high and low trigger temperatures. Said laminate member is also featured by a structure in which an undercoat layer, consisting of methacrylic resin with the glass transition point at least equal to 80° C. is provided on the substrate, and a structure in which a layer of transparent methacrylic or acrylic resin or copolymer resin thereof soluble in alcohol or aliphatic hydrocarbon is laminated on the layer of the thermochromic opaque/transparent composition.

The substrate to be employed in the present invention can be transparent or opaque according to the application. Examples of the transparent substrate include polyester film (amorphous polyester), polycarbonate, polystyrene, styrene-butadiene block copolymer resin, acrylonitrile-styrene copolymer resin, acrylic resin, methyl methacrylate resin, epoxy resin, polypropylene resin, hard or soft vinyl chloride resin, acrylonitrile-butadiene-styrene copolymer resin (transparent grade) and polypropylene resin.

Examples of the opaque or semi-transparent substrate include medium or low pressure polyethylene, acrylonitrile-butadiene-styrene copolymer resin, nylon, above-mentioned resin colored or opacified with pigment, paper, synthetic paper, fibers, filaments, glass and wood.

The thermochromic opaque/transparent composition of the present invention is dissolved in solvent and coated as explained before in forming laminated layer on the substrate, and said solvent often dissolves or swells the resin of the substrate, thereby exerting undesirable influences in chemical manner on the thermochromic property of said composition and in physical manner on the transparency thereof. For example, if the thermochromic opaque/transparent composition dissolved in methylisobutylketone is sprayed on a polystyrene substrate, the solvent dissolves the substrate resin, whereby polystyrene is introduced into said composition. As a result, the thermochromic property of said composition is often influenced chemically. It is therefore preferable to form an undercoat layer on the substrate, prior to the lamination of the thermochromic opaque/transparent composition.

For such undercoating, there is preferred methacrylate resin, which is applied on the substrate employing a solvent composition selected according to the coating method and not attacking the substrate. A more preferable resin is methacrylate resin with the glass transition point at least equal to 90° C., which can be polymethyl methacrylate (Tg: 125° C.), polyisopropyl methacrylate (Tg: 95° C.) or a copolymer resin with the glass transition point at least equal to 90° C.

Also a top coat layer may be laminated on the layer of the thermochromic opaque/transparent composition.

In the formation of such top coated layer, there will not only result a variation in the composition ratio of the thermochromic opaque/transparent composition but also a significant influence on the changes in color and in transparent/opaque state if the solvent for said top coating re-dissolves the layer of said thermochromic opaque composition. For this reason, the solvent to be employed in top coating should be practically free from dissolving or swelling of the thermochromic opaque/transparent composition. Examples of suitable solvent include water, alcohols, glycolethers and aliphatic hydrocarbons.

Examples of resin which is easily soluble or dispersible in such solvent and shows satisfactory adhesion to the vinyl chloride-vinyl acetate copolymer resin include methacrylate resin, vinyl-denatured alkyd resin, oil-soluble polyurethane resin, acrylic resin, acrylate copolymer resin and epoxy resin, soluble in the above-mentioned solvents.

In particular, methacrylate or acrylate resin, or copolymer resin thereof, soluble in alcohol or aliphatic hydrocarbon solvent, when dissolved in a solvent composition in which at least 40% is represented by alcohol and/or aliphatic hydrocarbon, can provide a transparent top coat layer with satisfactory coating property and satisfactory adhesion, without undesirable influence on the underlying layer of the thermochromic opaque composition.

In the above-mentioned undercoating and top coating, there may be effectively added ultraviolet absorbing agent, antioxidant, singlet oxygen extinguisher, colorant and other optical stabilizers, for the purpose of improving the light fastness of the thermochromic opaque composition.

In the following there will be explained the three-dimensional article of the present invention, capable of concealing and revealing the interior.

Said interior conceal/revealing three-dimensional article of the present invention is featured by a fact that the above-mentioned laminate member constitutes at least a part of a three-dimensional article containing an internal object therein, thereby concealing and revealing said internal object in response to temperature variation. Said three-dimensional article is a toy, a stationary article, a teaching aid or a decorative article, wherein an arbitrary object contained in said article can be concealed or revealed by the change between transparent and opaque states, together with a color change on the surface of said three-dimensional article, in response to temperature variation.

Dispersion of the thermochromic material, consisting of the three components (a), (b) and (c), in a state of small particles in the vinyl chloride-vinyl acetate copolymer matrix resin allows to maintain said components stably without bleeding to the resin surface, thereby achieving reversible change in transparency combined with color change, between a colored opaque state and a colorless transparent state in response to temperature variation, with hysteresis with a temperature difference of 10° C. to 50° C. between the high and low trigger temperatures.

In this case, by the effect of the hindered amine compound blended in the vinyl chloride-vinyl acetate copolymer matrix resin, the repeated thermochromic function can be properly continued without causing remaining color during coloring.

The above-mentioned structure has high transparency, without undesirable influence of light scattering, since the thermochromic material is not in the form of microencapsulated pigment. Consequently, the laminate member, employing said composition of the present invention, allows to clearly see an object, even when it is in a position distanced from said laminate member.

DETAILED DESCRIPTION OF THE PREFERRED EMBODIMENTS

Figure 1:
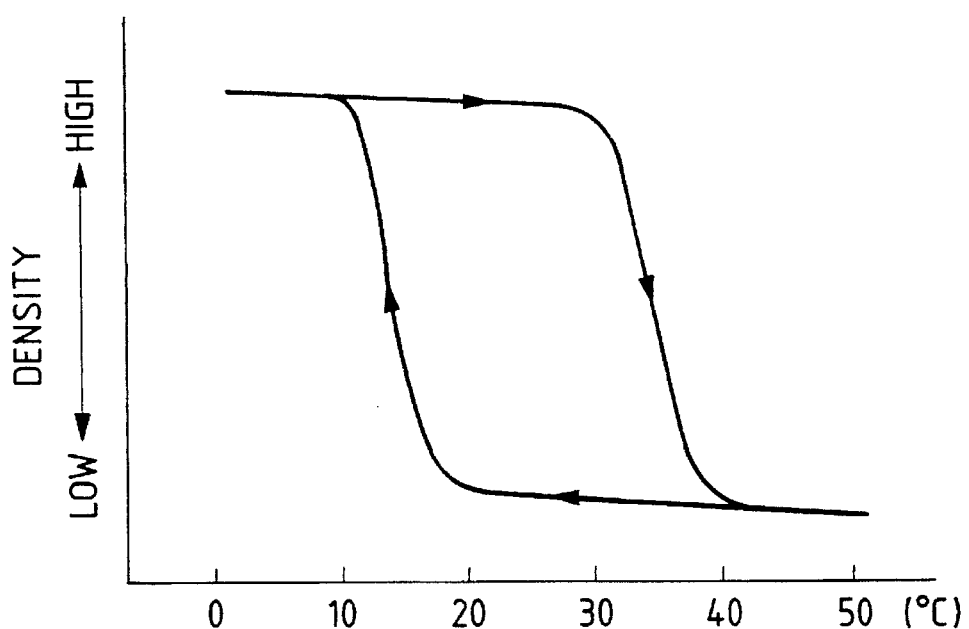
FIG. 1 is a chart showing color change of an example 1 of a printed article employing the thermochromic opaque/transparent composition of the present invention, in response to temperature variation, wherein a solid line indicates a colored opaque state while a broken line indicates an uncolored transparent state (also same in FIGS. 2 to 25)

Now the present invention will be clarified in greater details by embodiments thereof, wherein all the amounts are represented by parts by weight. With respect to the width of hysteresis, when the composition is shifted from the colored opaque state to the uncolored transparent state and is then cooled, said width becomes smaller if the heated temperature is in the vicinity of and not exceeding the high trigger temperature. The width of hysteresis mentioned in the present invention refers to the maximum width in a thermochromic opaque/transparent composition.

The color change temperature, absorbance and transmittance in the following examples were measured in the following manner.

(1) Color change temperature:

In each of examples 1 to 6, a specimen for measurement was prepared by adhering white synthetic paper of a thickness of 60 μm, with a two-sided adhesive tape, to the rear face of a polyethylene terephthalate film coated with the thermochromic opaque/transparent composition. Said specimen was adhered, further with a two-sided adhesive tape, onto the bottom face of a heat/cooling container, and was so set that said composition faces the light source of a color difference meter (model TC-3600 manufactured by Tokyo Denshoku Co., Ltd.). Water was placed in said container, then cooling (from 50° C. to 0° C.) and heating (from 0° C. to 50° C.) at a rate of 10° C./minute were conducted as a cycle, and the luminosity of the specimen was plotted at different temperatures.

(2) Absorbance and transmittance:

Absorbance (reflective) and transmittance were measured in a wavelength range of 400 to 700 nm by a spectrophotometer (auto-recording spectrophotometer model U-3210 manufactured by Hitachi Co., Ltd.), with a thermochromic opaque/transparent printed article prepared in each example set at the sample side, and with a polyethylene terephthalate film, same as used in said example, set at the reference side.

The measurement was conducted at 20° C., in the colored opaque state and in the uncolored transparent state.

In the attached drawings, solid lines indicate the absorbance and transmittance at 20° C. in the colored opaque state, and broken lines indicate those at 20° C. in the uncolored transparent state.

EXAMPLE 1

4 parts of 1,2-benz-6-dibutylaminofluorane, 6 parts of 1,1-bis(4'-hydroxyphenyl)hexane, 5 parts of stearyl caprate and 15 parts of stearyl laurate were dissolved in 300 parts of 20% solution of VYHH (vinyl chloride-vinyl acetate copolymer (86:14) resin, manufactured by Union Carbide Japan Co., Ltd.) dissolved in MIBK. Then 0.2 parts of Byk-310 (polyester-denatured dimethylpolysiloxane, manufactured by Byk Chemie) and 1 part of piperidine derivative (trade name SANOL LS770, manufactured by Sankyo Co., Ltd.) were added, whereby thermochromic opaque/transparent ink (A) was obtained.

The above-mentioned ink was applied with an applicator to coat a PET film (100 μm thick, trade name NF PET TOUMEI 100[A], manufactured by Rintek Co., Ltd.) so as to obtain a dried film thickness of about 15 μm, and dried at 80° C. for 30 minutes to obtain a thermochromic opaque printed article. It was observed that said composition was dispersed with a particle size of about 0.2 to 1.0 μm in the resin. Thus obtained printed article showed a low trigger temperature of about 12° C. and a high trigger temperature of about 39° C., with a width of hysteresis of about 20° C. The article became colorless and transparent above the high trigger temperature, and became pink and opaque below the low trigger temperature. The above-mentioned two states could be assumed selectively, within a range between the high and low trigger temperatures. The printed article could stably repeat the above-mentioned changes even after 500 cycles, without bleeding or other undesirable effect. Also similar change and stability could be confirmed after standing for one week in a thermostat chamber of 60° C.

Figure 2:
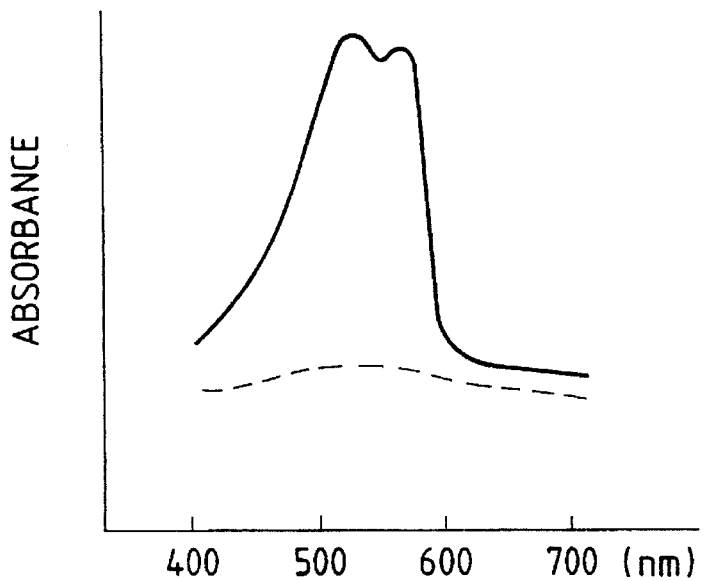
FIG. 2 is a chart showing absorbance of the printed article of the example 1, in the colored opaque state and in the uncolored transparent state.
Figure 3:
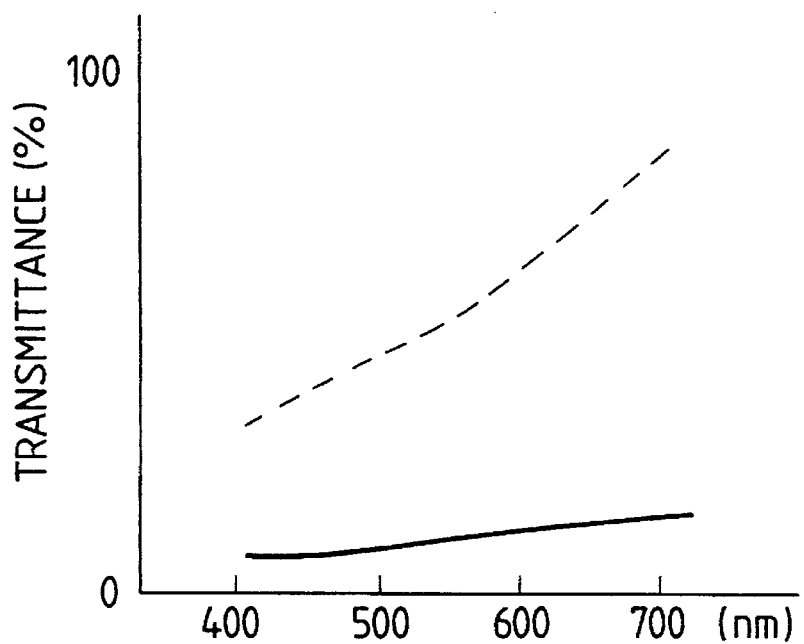
FIG. 3 is a chart showing transmission spectrum of the printed article of the example 1, in the colored opaque state and in the uncolored transparent state.

The color change curve of said printed article, the absorbance and transmittance in the colored opaque state and in the uncolored transparent state are respectively shown in FIGS. 1, 2 and 3.

EXAMPLE 2

2 parts of 2-chloro-3-methyl-6-diethylamino-fluorane, 5 parts of 2,2-bis(4'-hydroxyphenyl)propane and 20 parts of myristyl alcohol were dissolved in 300 parts of 20% solution of Denkavinyl 1000D (vinyl chloride-vinyl acetate copolymer (68:32) resin, manufactured by Denki Kagaku Kogyo Co., Ltd.) dissolved in MIBK/xylene (½). Then 0.2 parts of Byk-325 (polyether-denatured dimethylpolysiloxane, manufactured by Byk Chemie) and 0.5 parts of piperidine derivative (trade name: Tinuvin 944LD, manufactured by Ciba-Geigy) were added, whereby thermochromic opaque/transparent ink (B) was obtained.

The above mentioned ink was applied with an applicator to coat a PET film (100 μm thick, trade name NF PET TOUMEI 100[A], manufactured by Rintek Co., Ltd.) so as to obtain a dried film thickness of about 20 μm, and dried at 80° C. for 30 minutes to obtain a thermochromic opaque printed article. It was observed that said composition was dispersed with a particle size of about 0.2 to 2.0 μm in the resin.

Thus obtained printed article showed a low trigger temperature of about 4° C. and a high trigger temperature of about 33° C., with a width of hysteresis of about 20° C. The article became colorless and transparent above the high trigger temperature, and became vermilion and opaque below the low trigger temperature. The above-mentioned two states could be assumed selectively, within a range between the high and low trigger temperatures.

The above-mentioned change could be stably repeated even after 500 cycles, without bleeding or other undesirable effect. Also similar change and stability could be confirmed after standing for one week in a thermostat chamber of 60° C.

Figure 4:
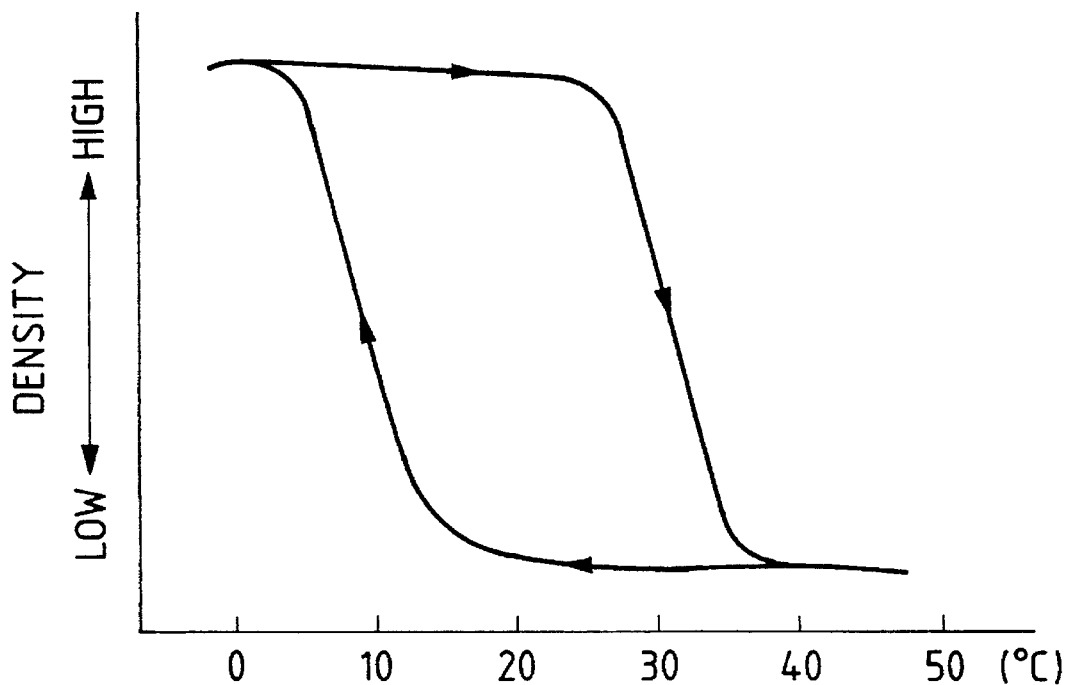
FIG. 4 is a chart showing color change of a printed article of an example 2 employing the thermochromic opaque/transparent composition of the present invention, in response to temperature variation.
Figure 5:
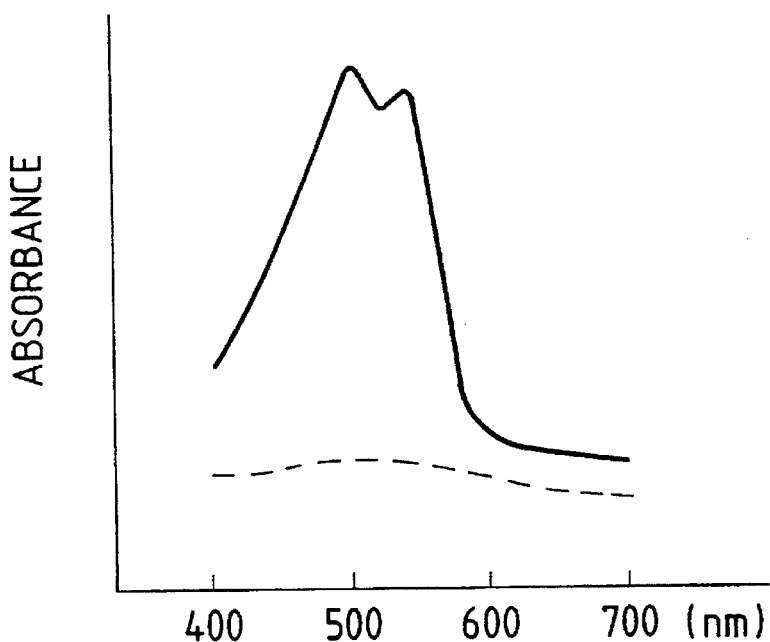
FIG. 5 is a chart showing absorbance of the printed article of the example 2, in a colored opaque state and in an uncolored transparent state.
Figure 6:
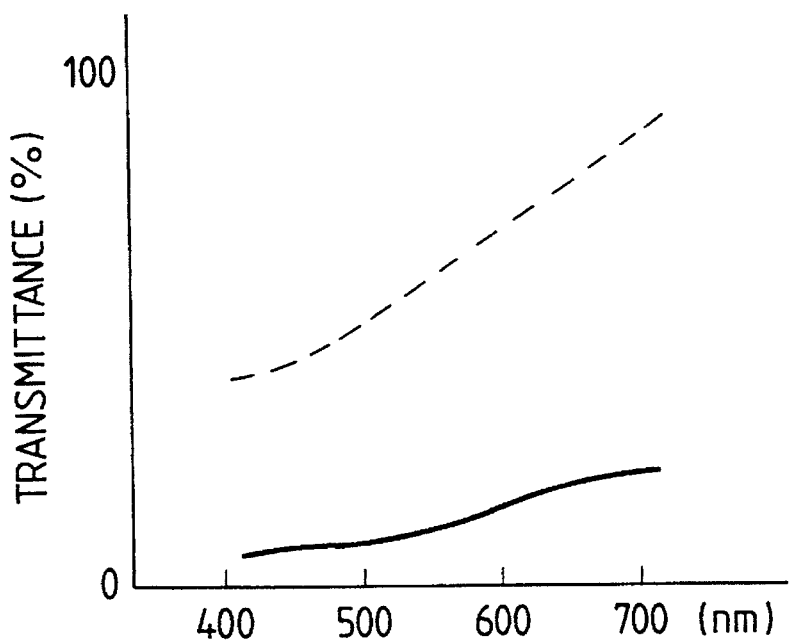
FIG. 6 is a chart showing transmission spectrum of the printed article of the example 2 in the colored opaque state and in the uncolored transparent state.

The color change curve of said printed article, the absorbance and transmittance in the colored opaque state and in the uncolored transparent state are respectively shown in FIGS. 4, 5 and 6.

EXAMPLE 3

2 parts of 3-cyclohexylamino-6-chlorofluorane, 5 parts of 1,1-bis(4'-hydroxyphenyl)octane, 2 parts of 2,2-bis(4'-hydroxyphenyl)propane, 10 parts of cetyl alcohol and 10 parts of stearyl caprate were dissolved in 300 parts of 20% solution of Denkavinyl 1000MTS (vinyl chloride-vinyl acetate copolymer (70:30) resin, manufactured by Denki Kagaku Kogyo Co., Ltd.) dissolved in MIBK/xylene (½). Then 0.2 parts of Byk-300 (polyether-denatured dimethylpolysiloxane, manufactured by Byk Chemie) and 2 parts of piperidine derivative (trade name: SANOL LS770, manufactured by Sankyo Co., Ltd.) were added, whereby thermochromic opaque/transparent ink (C) was obtained.

The above-mentioned ink was applied with an applicator to coat a PET film (100 μm thick, trade name NF PET TOUMEI 100[A], manufactured by Rintek Co., Ltd.) so as to obtain a dried film thickness of about 15 μm, and dried at 80° C. for 30 minutes to obtain a thermochromic opaque printed article. It was observed that said composition was dispersed with a particle size of about 0.1 to 1.0 μm in the resin.

Thus obtained printed article showed a low trigger temperature of ca. 6° C. and a high trigger temperature of ca. 30° C., with a width of hysteresis of ca. 16° C. The article became colorless and transparent above the high trigger temperature, and became orange and opaque below the low trigger temperature. The above-mentioned two states could be selectively assumed, within a range between the high and low trigger temperatures. The above-mentioned change could be stably repeated even after 500 cycles, without bleeding or other undesirable effects. Also similar change and stability could be confirmed after standing for one week in a thermostat chamber of 60° C.

Figure 7:
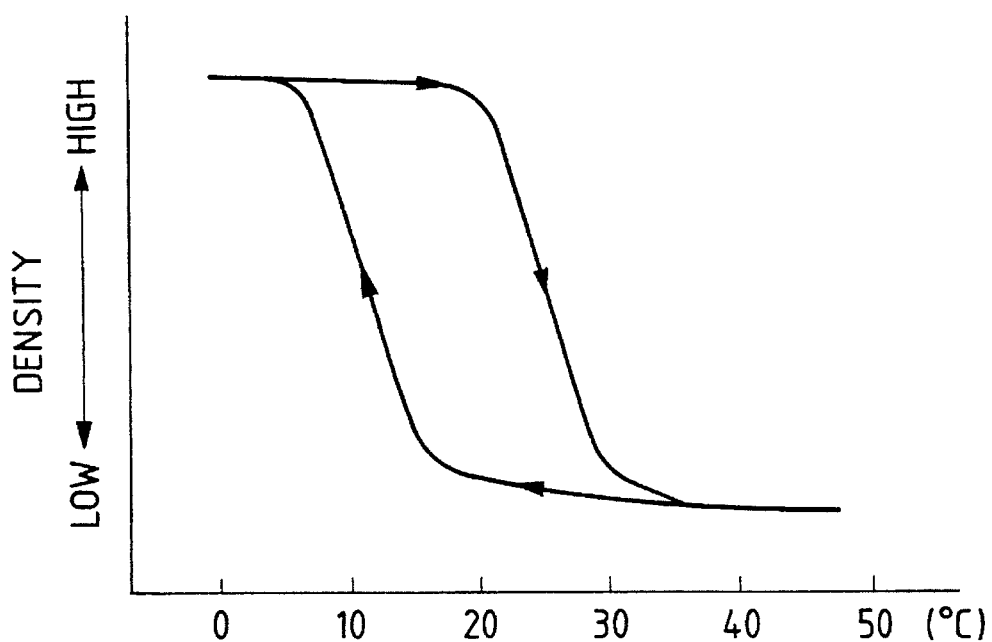
FIG. 7 is a chart showing color change of a printed article of an example 3 employing the thermochromic opaque/transparent composition of the present invention, in response to temperature variation.
Figure 8:
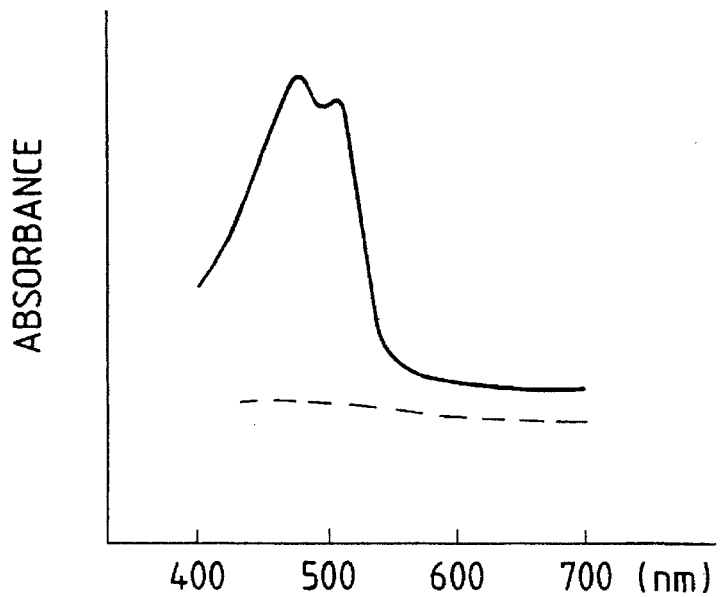
FIG. 8 is a chart showing absorbance of the printed article of the example 3, in a colored opaque state and in an uncolored transparent state.
Figure 9:
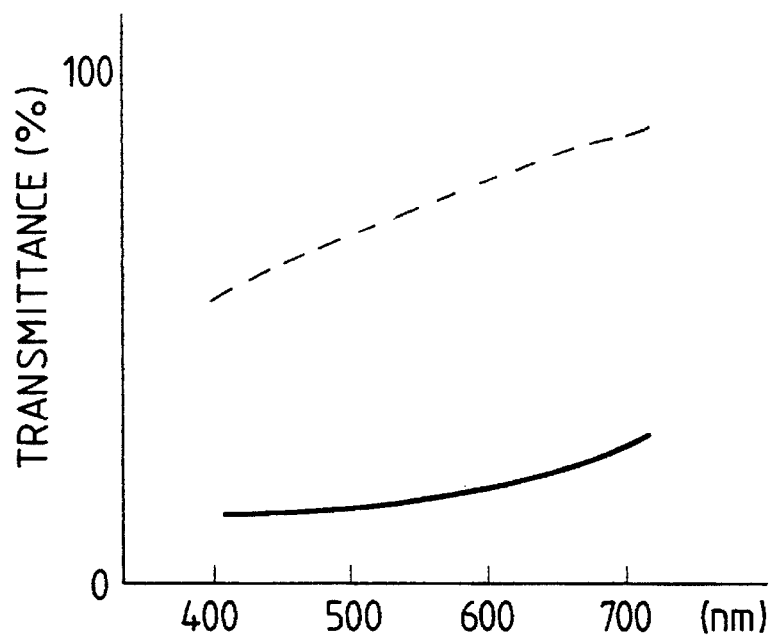
FIG. 9 is a chart showing transmission spectrum of the printed article of the example 3 in the colored opaque state and in the uncolored transparent state.

The color change curve of said printed article, the absorbance and transmittance in the colored opaque state and in the uncolored transparent state are respectively shown in FIGS. 7, 8 and 9.

EXAMPLE 4

1.5 parts of 2-phenyl-6-(N-ethyl-N-hexylamino)-fluorane, 8 parts of 2,2-bis(4'-hydroxyphenyl)decane and 20 parts of lauryl stearate were dissolved in 300 parts of 20% solution of Denkavinyl 1000 MTS (vinyl chloride-vinyl acetate copolymer (70:30) resin, manufactured by Denki Kagaku Kogyo Co., Ltd.) dissolved in MIBK/xylene (½). Then 0.1 parts of FC-430 (fluorine-containing levelling agent, manufactured by Sumitomo 3M Co., Ltd.) and 1.5 parts of piperidine derivative (trade name: Tinuvin 144, manufactured by Ciba-Geigy) were added, whereby thermochromic opaque/transparent ink (D) was obtained.

The above-mentioned ink was applied with an applicator to coat a PET film (100 μm thick, trade name NF PET TOUMEI 100[A], manufactured by Rintek Co., Ltd.) so as to obtain a dried film thickness of about 15 μm, and dried at 80° C. for 30 minutes to obtain a thermochromic opaque printed article. It was confirmed that said composition was dispersed with a particle size of about 0.2 to 1.5 μm in the resin. Thus obtained printed article showed a low trigger temperature of ca. 6° C. and a high trigger temperature of ca. 38° C., with a width of hysteresis of ca. 28° C. The article became colorless and transparent about the high trigger temperature, and became green and opaque below the low trigger temperature. The above-mentioned two states could be selectively assumed, within a range between the high and low trigger temperatures. The above-mentioned change could be stably repeated even after 500 cycles, without bleeding or other undesirable effects. Also similar change and stability could be confirmed after standing for one week in a thermostat chamber of 60° C.

Figure 10:
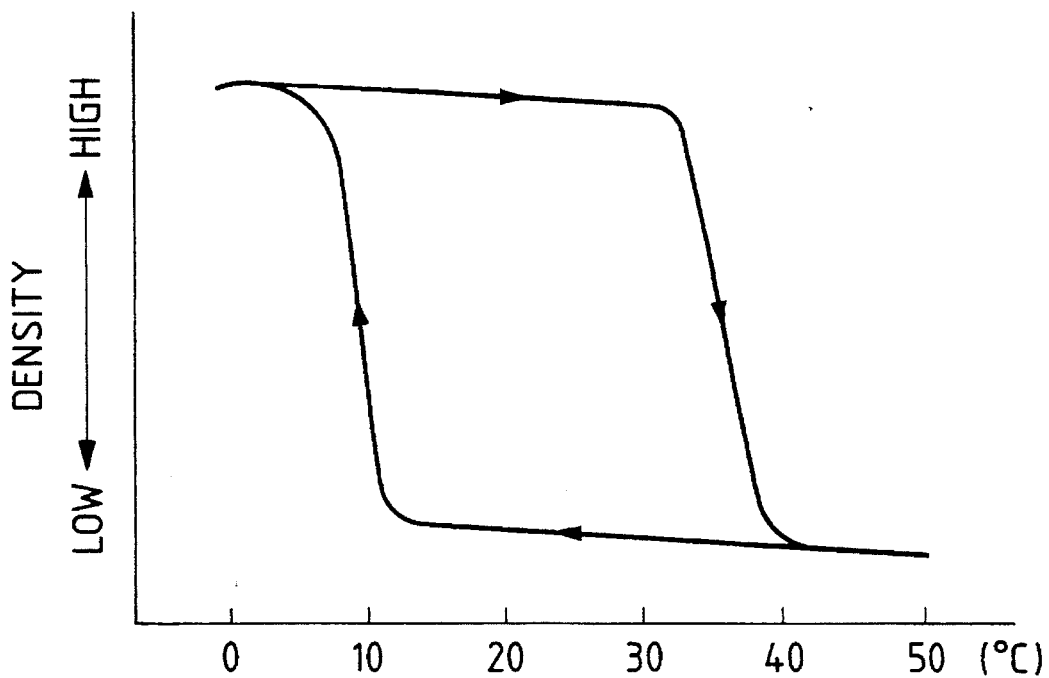
FIG. 10 is a chart showing color change of a printed article of an example 4 employing the thermochromic opaque/transparent composition of the present invention, in response to temperature variation.
Figure 11:
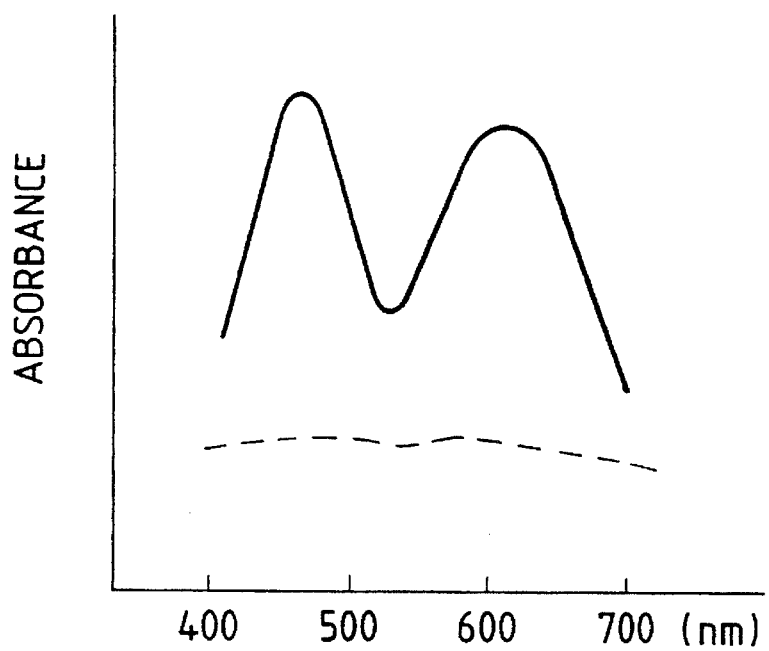
FIG. 11 is a chart showing absorbance of the printed article of the example 4 in a colored opaque state and in an uncolored transparent state.
Figure 12:
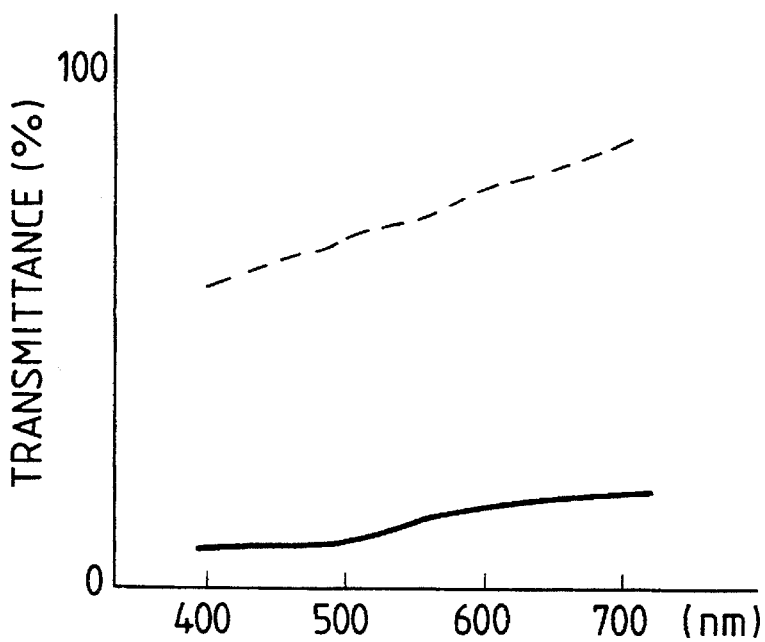
FIG. 12 is a chart showing transmission spectrum of the printed article of the example 4 in the colored opaque state and in the uncolored transparent state.

The color change curve of said printed article, the absorbance and transmittance in the colored opaque state and in the uncolored transparent state are respectively shown in FIGS. 10, 11 and 12.

EXAMPLE 5

1.5 parts of 1,2-benz-6-diethylaminofluorane, 5 parts of 2,2-bis(4'-hydroxyphenyl)octane and 20 parts of neopentylglycol dipalmitate were dissolved in 300 parts of 20% solution of VYHD (vinyl chloride-vinyl acetate copolymer (86:14) resin, manufactured by Union Carbide Japan Co., Ltd.) dissolved in MIBK/xylene (½). Then 0.2 parts of Byk-310 (polyester-denatured dimethylpolysiloxane, manufactured by Byk Chemie) and 1 part of piperidine derivative (trade name: SANOL LS744, manufactured by Sankyo Co., Ltd.) were added, whereby thermochromic opaque/transparent ink (E) was obtained.

The above-mentioned ink was applied with an applicator to coat a PET film (100 μm thick, trade name NF PET TOUMEI 100[A], manufactured by Rintek Co., Ltd.) so as to obtain a dried film thickness of about 15 μm, and dried at 80° C. for 30 minutes to obtain a thermochromic opaque printed article. It was confirmed that said composition was dispersed with a particle size of about 0.2 to 1.0 μm in the resin.

Thus obtained printed article showed a low trigger temperature of about 0° C. and a high trigger temperature of about 37° C., with a width of hysteresis of about 33° C. The article became colorless and transparent above the high trigger temperature, and became pink and opaque below the low trigger temperature. The above-mentioned two states could be selectively assumed, within a range between the high and low trigger temperatures. The above-mentioned change could be stably repeated even after 500 cycles, without bleeding or other undesirable effects. Also similar change and stability could be confirmed after standing for one week in a thermostat chamber of 60° C.

Figure 13:
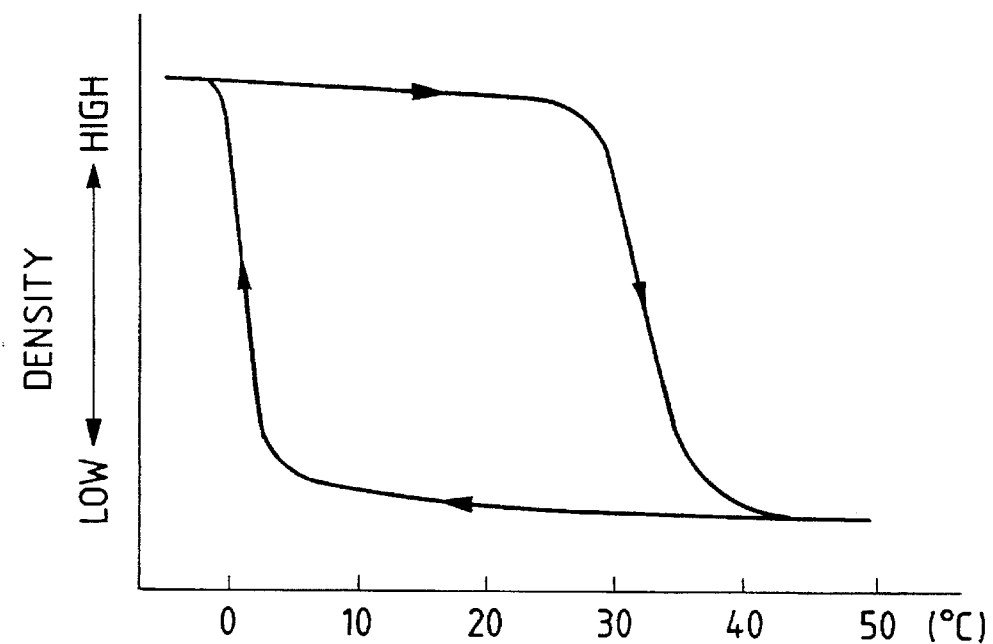
FIG. 13 is a chart showing color change of a printed article of an example 5 employing the thermochromic opaque/transparent composition of the present invention, in response to temperature variation.
Figure 14:
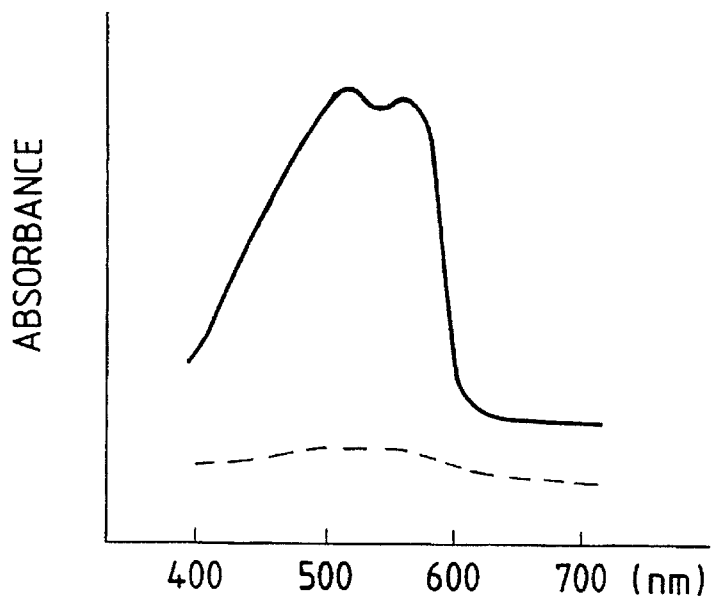
FIG. 14 is a chart showing absorbance of the printed article of the example 5 in a colored opaque state and in an uncolored transparent state.
Figure 15:
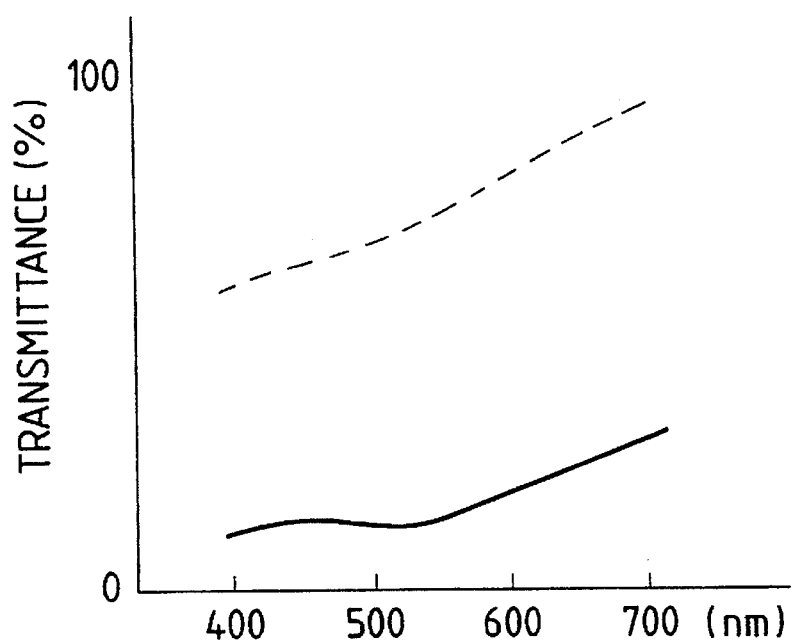
FIG. 15 is a chart showing transmission spectrum of the printed article of the example 5 in the colored opaque state and in the uncolored transparent state.

The color change curve of said printed article, the absorbance and transmittance in the colored opaque state and in the uncolored transparent state are respectively shown in FIGS. 13, 14 and 15.

EXAMPLE 6

2 parts of 2-(3'-trifluoromethylphenyl)amino-6-diethylaminofluorane, 5 parts of 2,2-bis(4'-hydroxyphenyl)-octane and 20 parts of dilauryl azelate were dissolved in 300 parts of 20% solution VYHD (vinyl chloride-vinyl acetate copolymer (86:14) resin, manufactured by Union Carbide Japan Co., Ltd.) dissolved in MIBK/xylene (½). Then 0.3 parts of Byk-310 (polyester-denatured dimethylpolysiloxane, manufactured by Byk Chemie) and 1 part of piperidine derivative (trade name: SANOL LS440, manufactured by Sankyo Co., Ltd.) were added, whereby thermochromic opaque/transparent ink (F) was obtained.

The above-mentioned ink was coated with an applicator onto a PET film (100 μm thick, trade name NF PET TOUMEI 100[A], manufactured by Rintek Co., Ltd.) so as to obtain a dried film thickness of about 15 μm, and dried at 80° C. for 30 minutes to obtain a thermochromic opaque printed article. It was confirmed that said composition was dispersed with a particle size of about 0.2 to 1.5 μm in the resin.

Thus obtained printed article showed a low trigger temperature of about −6° C., and a high trigger temperature of about 37° C., with a width of hysteresis of about 33° C. The article became colorless and transparent above the high trigger temperature, and became dark gray and opaque below the low trigger temperature. The above-mentioned two states could be assumed selectively, in a range between the high and low trigger temperatures. The above-mentioned change could be stably repeated even after 500 cycles, without bleeding or other undesirable effects. Also similar change and stability could be confirmed after standing for one week in a thermostat chamber of 60° C.

Figure 16:
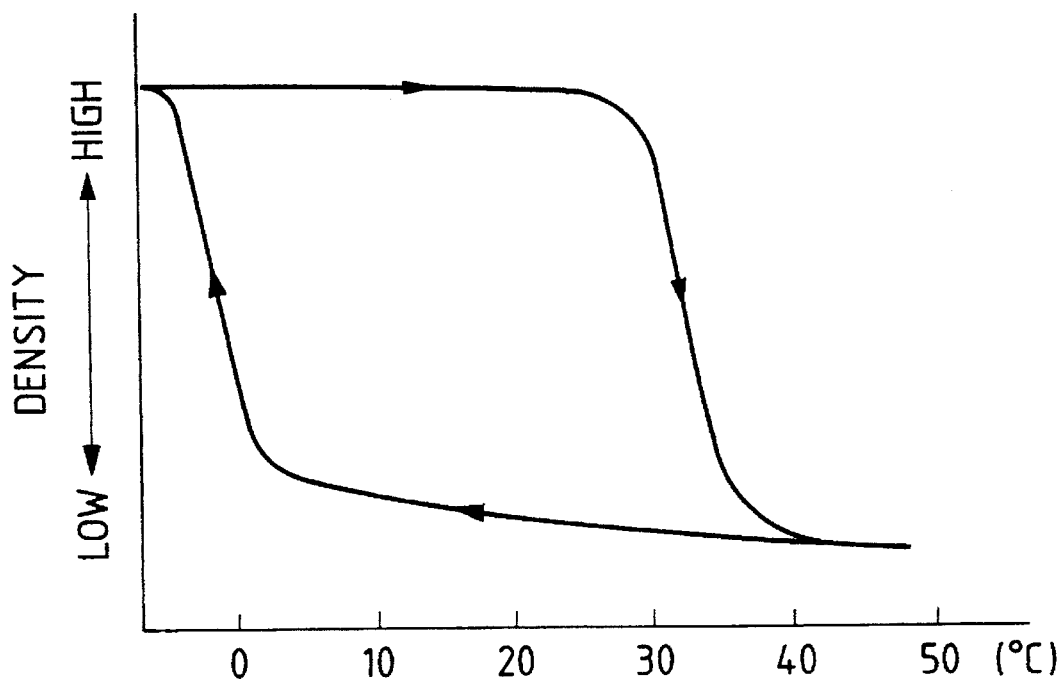
FIG. 16 is a chart showing color change of a printed article of an example 6 employing the thermochromic opaque/transparent composition of the present invention, in response to temperature variation.
Figure 17:
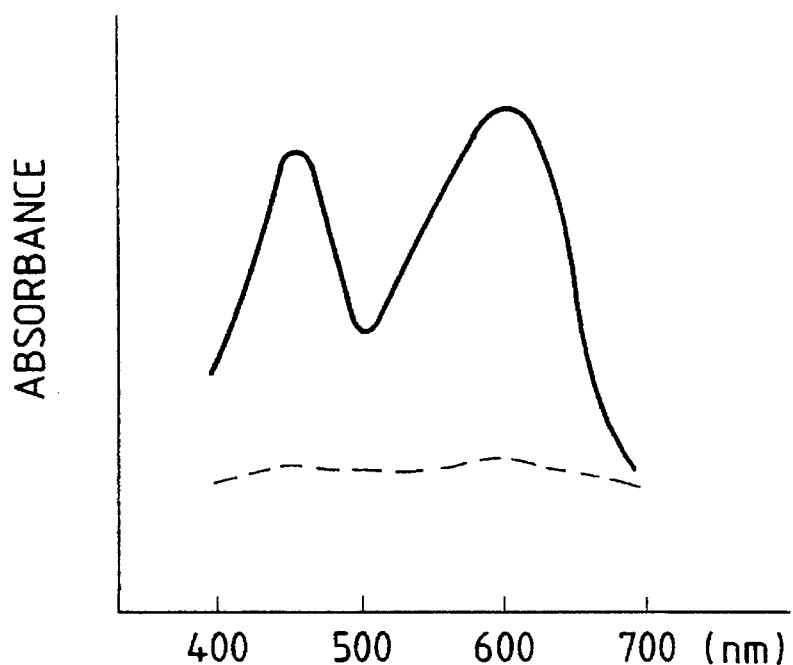
FIG. 17 is a chart showing absorbance of the printed article of the example 6 in a colored opaque state and in an uncolored transparent state.
Figure 18:
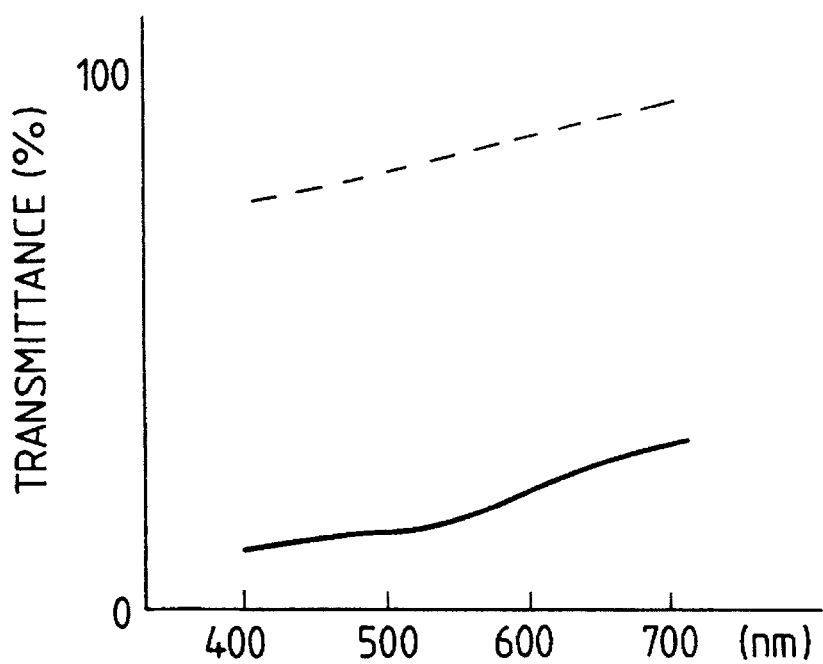
FIG. 18 is a chart showing transmission spectrum of the printed article of the example 6 in the colored opaque state and in the uncolored transparent state.

The color change curve of said printed article, the absorbance and transmittance in the colored opaque state and in the uncolored transparent state are respectively shown in FIGS. 16, 17 and 18.

EXAMPLE 7

Preparation of a three-dimensional molded article of GPPS (polystyrol):
[1] Ink preparation:
  (1) Undercoat ink:
  Undercoat ink (a) was prepared by dissolving 10 parts of Acrypet VK (methyl methacrylate resin manufactured by Mitsubishi Rayon Co., Ltd.) in 60 parts of MIBK and 30 parts of propyleneglycol monomethylether.
  (2) Thermochromic opaque/transparent ink:
  Thermochromic opaque/transparent ink (A') was prepared by mixing 300 parts of the thermochromic opaque/transparent ink (A) of the example 1 with 250 parts of MIBK and 50 parts of cyclohexanone.
  (3) Topcoat ink:
  Topcoat ink was prepared by dissolving 20 parts of Plus-size CB-2 (alcohol-soluble acrylic resin, in 50% ethanolic solution, manufactured by Go-oh Chemical Co., Ltd.) and 0.5 parts of Tinuvin 328 (ultraviolet absorbing agent manufactured by Ciba-Geigy) in 50 parts of isopropanol and 30 parts of n-butanol.
[2] Preparation of laminate member:
  On the external surface of hollow cube (10×10 cm) molded of transparent GPPS and incorporating therein a pale red miniature car as the internal object, the undercoat ink (a) was sprayed and dried at 80° C. for 30 minutes. The obtained undercoat layer had a dried thickness of ca. 5 μm.

Then the thermochromic opaque/transparent ink (A') was sprayed thereon and dried at 80° C. for 30 minutes. The obtained ink layer had a dried thickness of about 15 μm.

Then the topcoat ink (b) was applied as the protective layer and dried at 80° C. for 30 minutes. The obtained topcoat layer had a dried thickness of about 10 μm.

Thus prepared molded article, when immersed in iced water of 10° C., became pink and opaque, whereby the internal miniature car could not be viewed at all. When immersed in warm water of 45° C., it became colorless and transparent, whereby the miniature car could be clearly viewed. This state did not change at all when it was placed in a location of room temperature, or 25° C. Similar change could be confirmed after 500 cycles of said change.

EXAMPLE 8

Preparation of plastic bottle of polycarbonate resin:

[1] Ink preparation:

(1) Undercoat ink:

Undercoat ink (c) was prepared by dissolving 10 parts of Dianal BR-80 (methyl methacrylate resin, manufactured by Mitsubishi Rayon Co., Ltd.) in 60 parts of MIBK and 30 parts of cyclohexanone.

(2) Thermochromic opaque/transparent ink:

Thermochromic opaque/transparent ink (B') was prepared by mixing 300 parts of the thermochromic opaque/transparent ink (B) of the example 2 with 150 parts of MIBK.

(3) Topcoat ink:

Topcoat ink (d) was prepared by dissolving 10 parts of Dianal BR-102 (alcohol soluble acrylic resin, manufactured by Mitsubishi Rayon Co., Ltd.) and 1 part of Tinuvin PS (ultraviolet absorbing agent, manufactured by Ciba-Geigy) in 60 parts of isopropyl alcohol and 30 parts of n-butanol.

[2] Preparation of laminate member:

On the external surface of a transparent polycarbonate bottle (having a cylindrical form with a diameter of 8 cm and a height of 10 cm, and incorporating a pink rabbit doll), the above-mentioned inks (c), (B') and (d) were applied in succession, in the same coating and drying methods as in the example 7.

The prepared article, when placed in a freezer of −5° C., instantly became vermilion and turbid, whereby the internal doll became no longer observable at all.

When warmed with a hair blower, said article instantly became colorless and transparent, whereby the internal doll could be viewed. This colorless transparent state was retained after standing for 3 days at room temperature. Also the above-mentioned change could be confirmed even after 500 cycles.

EXAMPLE 9

Preparation of a polycarbonate automobile toy:

An automobile toy provided with a polycarbonate window was prepared, and said window was coated with the thermochromic opaque/transparent ink and the undercoat ink same as those in the example 8, in the same manner as in said example 8.

Figure 27:
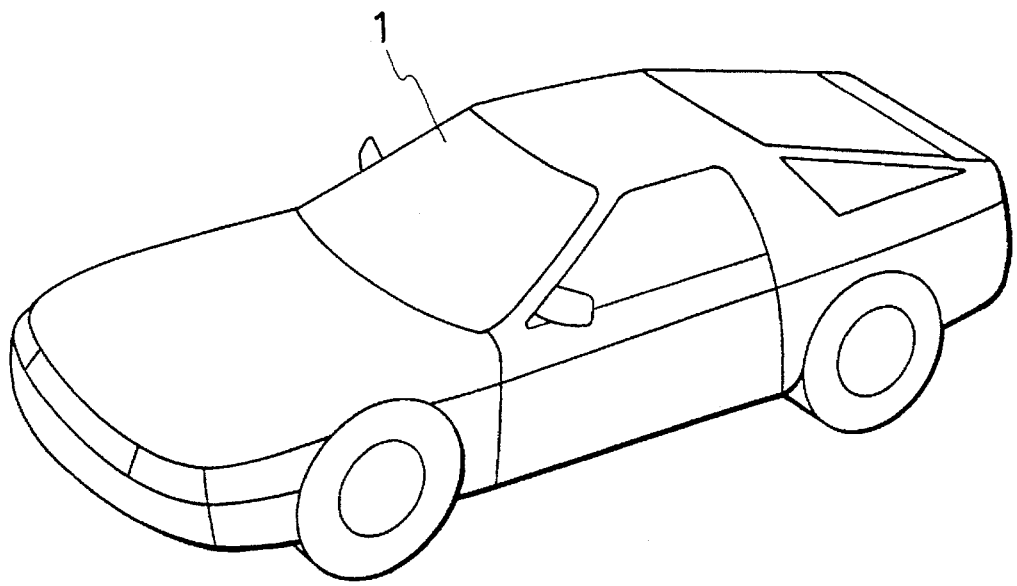
FIG. 27 is a perspective view of a toy capable of concealing or revealing the interior, employing the laminate member of the present invention, in a colored opaque state.
Figure 28:
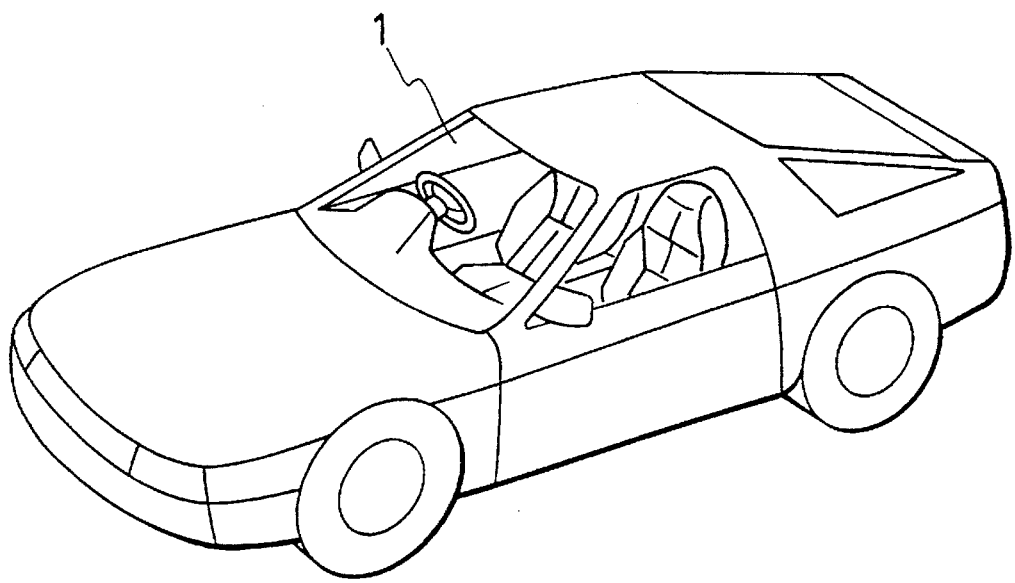
FIG. 28 is a perspective view of the toy shown in FIG. 27, in an uncolored transparent state.

Thus processed window could repeat the phase change as in the example 8, in response to the temperature variation, thereby concealing and revealing the interior. (see FIGS. 27 and 28)

EXAMPLE 10

A methyl methacrylate resin three-dimensional article:

[1] Ink preparation:

(1) Undercoat ink:

Undercoat ink (e) was prepared by dissolving 5 parts of Dianal BR-85 (methyl methacrylate resin, manufactured by Mitsubishi Rayon Co., Ltd.) in 65 parts of MIBK and 30 parts of cyclohexanone.

(2) Thermochromic opaque/transparent ink:

Thermochromic opaque/transparent ink (C') was prepared by mixing 300 parts of the thermochromic opaque/transparent ink (C) of the example 3 with 50 parts of cyclohexanone and 250 parts of MIBK.

(3) Topcoat ink:

Topcoat ink (f) was prepared by dissolving 20 parts of Plus-size L-53 (alcohol-soluble acrylic resin, in 50% ethanolic solution, manufactured by Go-oh Chemical Co., Ltd.) and 0.5 parts of Tinuvin PS (ultraviolet absorbing agent, manufactured by Ciba-Geigy) in 80 parts of n-propyl alcohol.

[2] Preparation of laminate member:

In a transparent gem box of methyl methacrylate resin, incorporating toy accessories, a lid (8×15 cm) was coated in succession with the inks (e), (C') and (f) in the same manner as in the example 7. Other portions of the box were coated with the ordinary commercial black lacquer. Thus prepared article had a low trigger temperature of ca. 6° C. and a high trigger temperature of ca. 30° C., and became colorless above said high trigger temperature whereby the content could be viewed, while became orange and turbid whereby the content could not be observed.

The above-mentioned change could be confirmed even after 500 cycles of change.

EXAMPLE 11

Preparation of a polyester bottle:

[1]Ink preparation:

(1) Undercoat ink:

Undercoat ink (g) was prepared by dissolving 10 parts of Dianal BR-83 (methyl methacrylate resin, manufactured by Mitsubishi Rayon Co., Ltd.) in 80 parts of MIBK and 10 parts of cyclohexanone.

(2) Thermochromic opaque/transparent ink:

Thermochromic opaque/transparent ink (D') was prepared by mixing 300 parts of the thermochromic opaque/transparent ink (D) of the example 4 with 150 parts of xylene.

(3) Topcoat ink:

Topcoat ink (h) was prepared by dissolving 50 parts of Acrydic A-188 (turpene-soluble acrylic resin, manufactured by Dai-Nippon Ink Co., Ltd.) in 50 parts of mineral turpene.

[2]Preparation of laminate member:

A transparent polyester bottle, containing an artificial flower therein, was coated, in succession, with the inks (g), (D') and (h) in the same manner as in the example 7.

Thus prepared bottle, after drying, was colorless and transparent.

When immersed in iced water of 3° C., the bottle instantly became opaque green, whereby the content of the bottle could no longer be observable. Said opaque green state was retained even after standing for one month in atmosphere of room temperature (25° C.). When immersed in warm water of 50° C., the bottle instantly became colorless and transparent, whereby the internal artificial flower could be clearly viewed. Said colorless transparent state was retained when the bottle was returned to the room temperature (25° C.).

The above-mentioned change could be confirmed even after 150 cycles.

REFERENCE EXAMPLE 1

A printed article was prepared in the same manner as in the example 1, except that VYHH therein was replaced by Superchlon 106N (chlorinated polypropylene resin, manufactured by Sanyo-Kokusaku Pulp Co., Ltd.). The obtained printed article was pink below the low trigger temperature (12° C.), but was not opaque. It was colorless and transparent above the high trigger temperature (39° C.). It exhibited a change in color, but not in the transparent/opaque state.

In observation of said printed article under a microscope, the three-component thermochromic material was mutually dissolved, so that the dispersed particles could not be observed. After standing for 3 days in a thermostat of 60° C., the surface showed significant bleeding of the three-component thermochromic material.

Figure 19:
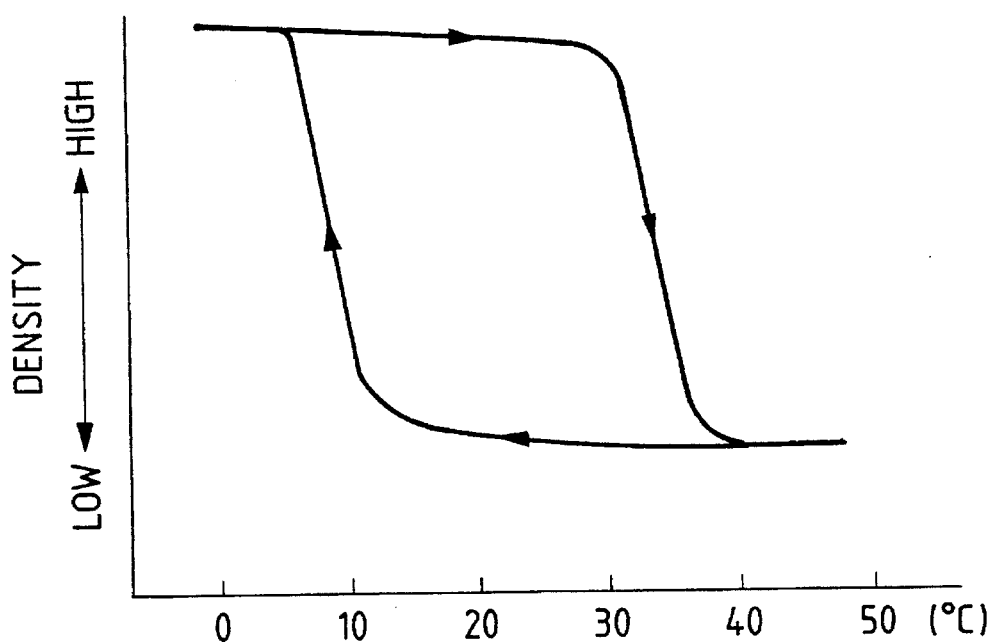
FIG. 19 is a chart showing color change in a printed article of a reference example 1, in response to temperature variation.

The color change curve of said printed article is shown in FIG. 19.

REFERENCE EXAMPLE 2

A printed article was prepared in the same manner as in the example 1, except that VYHH therein was replaced by Paraloid B-73 (thermoplastic acrylic resin, manufactured by Rohm and Haas Japan Co., Ltd.). Thus prepared printed article did not develop color even when cooled to below $-10°$ C., thus lacking reversible thermochromic property. It however showed change in the transparent/opaque state, with trigger temperatures approximately same as those in the example 1.

REFERENCE EXAMPLE 3

A printed article was prepared in the same manner as in the example 2, except that myristyl alcohol was employed with an amount of 60 parts. The obtained printed article was significantly inferior in the transparency above the high trigger temperature, so that it was practically not viewed through.

Figure 20:
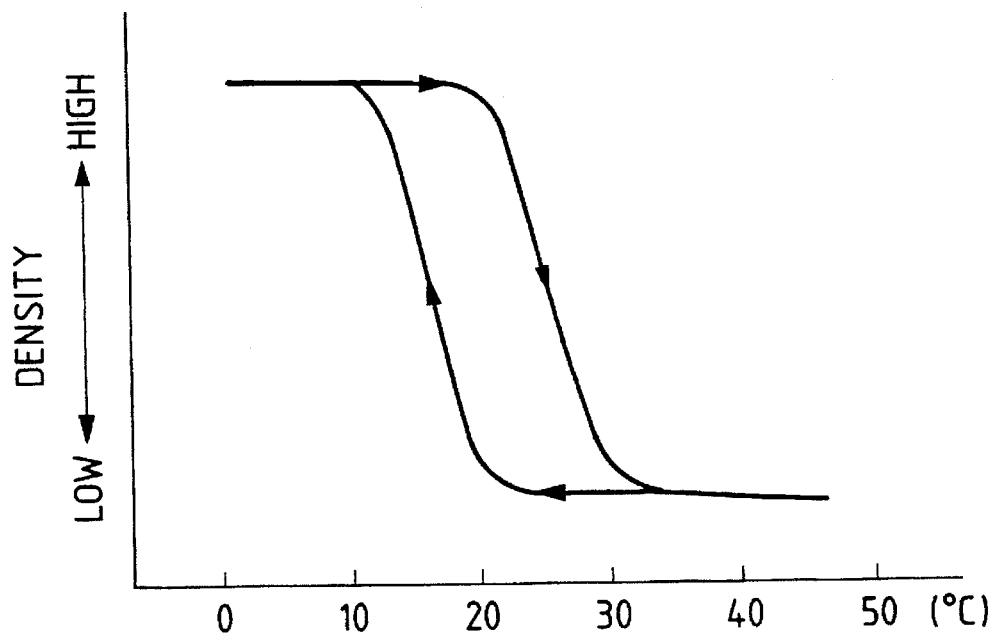
FIG. 20 is a chart showing color change in a printed article of a reference example 3, in response to temperature variation.
Figure 21:
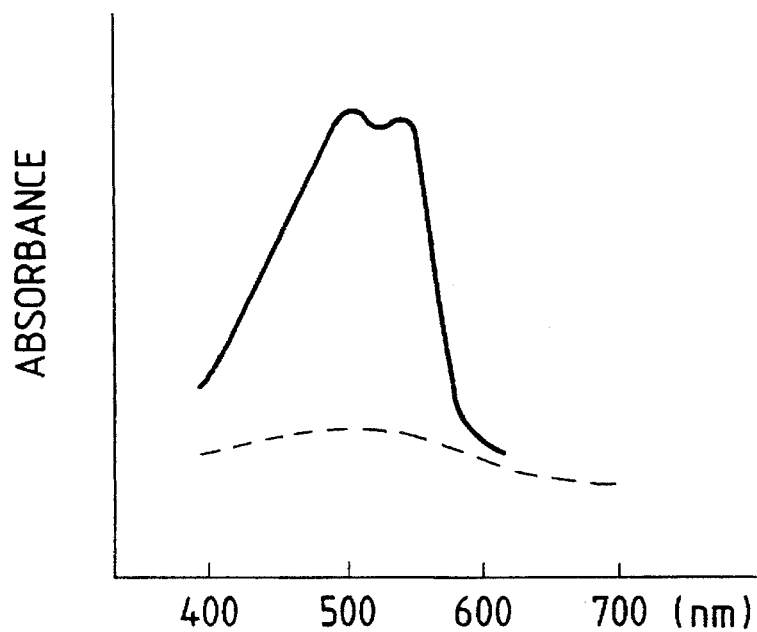
FIG. 21 is a chart showing absorbance of the printed article of the reference example 3 in a colored opaque state and in an uncolored transparent state.
Figure 22:
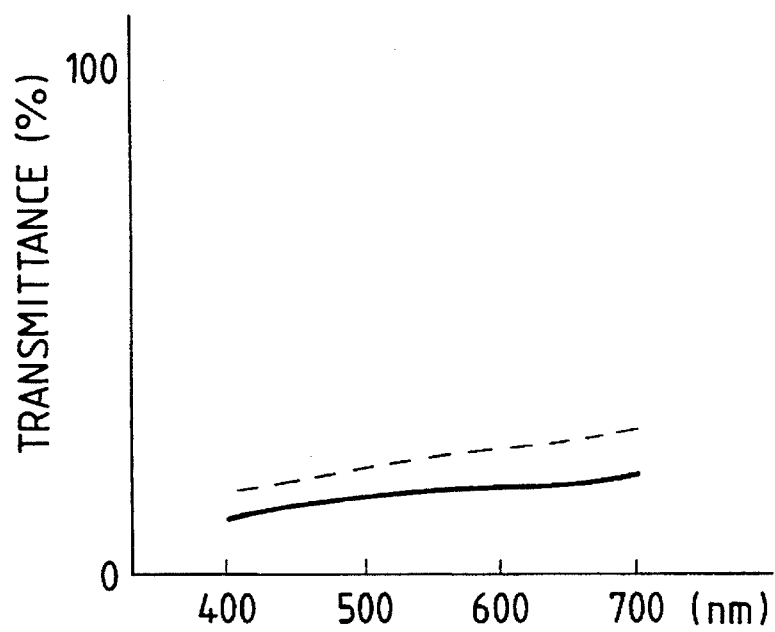
FIG. 22 is a chart showing transmission spectrum of the printed article of the reference example 3 in the colored opaque state and in the uncolored transparent state.

The color change curve of said printed article, the absorbance and transmittance in the colored opaque state and in the uncolored transparent state are respectively shown in FIGS. 20, 21 and 22.

REFERENCE EXAMPLE 4

A printed article was prepared in the same manner as in the example 4, except that 2,2-bis(4'-hydroxyphenyl)decane was replaced by bis-(4'-hydroxyphenyl)methane. Thus prepared printed article showed strong retentive green color even when heated above 40° C. Otherwise it showed changes similar to those in the example 4.

Figure 23:
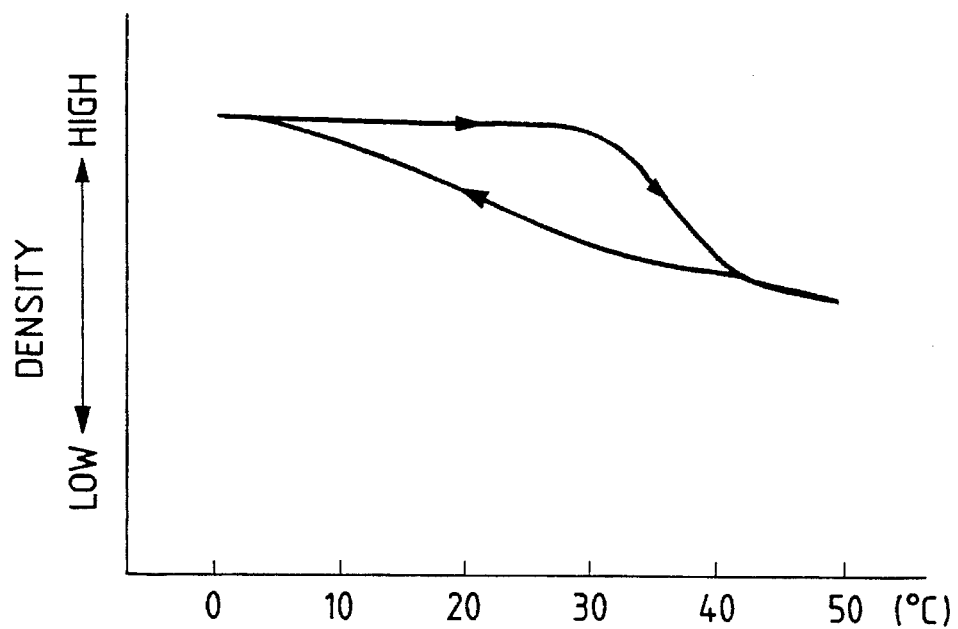
FIG. 23 is a chart showing color change of a printed article of a reference example 4 in response to temperature variation.
Figure 24:
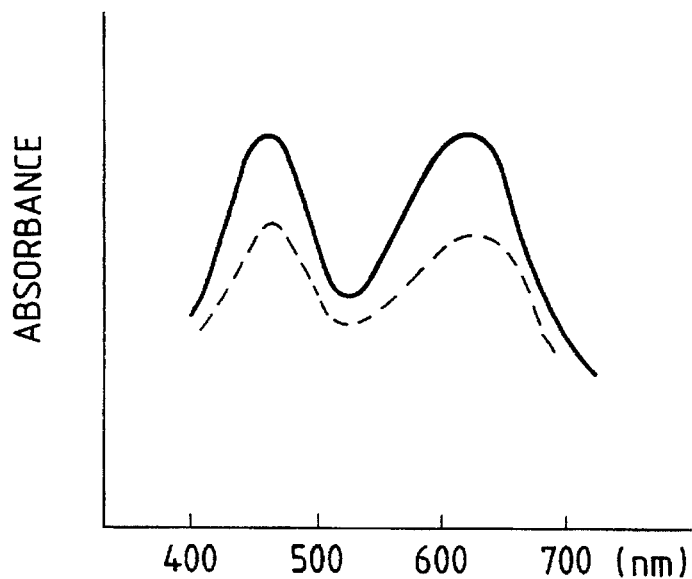
FIG. 24 is a chart showing absorbance of the printed article of the reference example 4 in a colored opaque state and in an uncolored transparent state.
Figure 25:
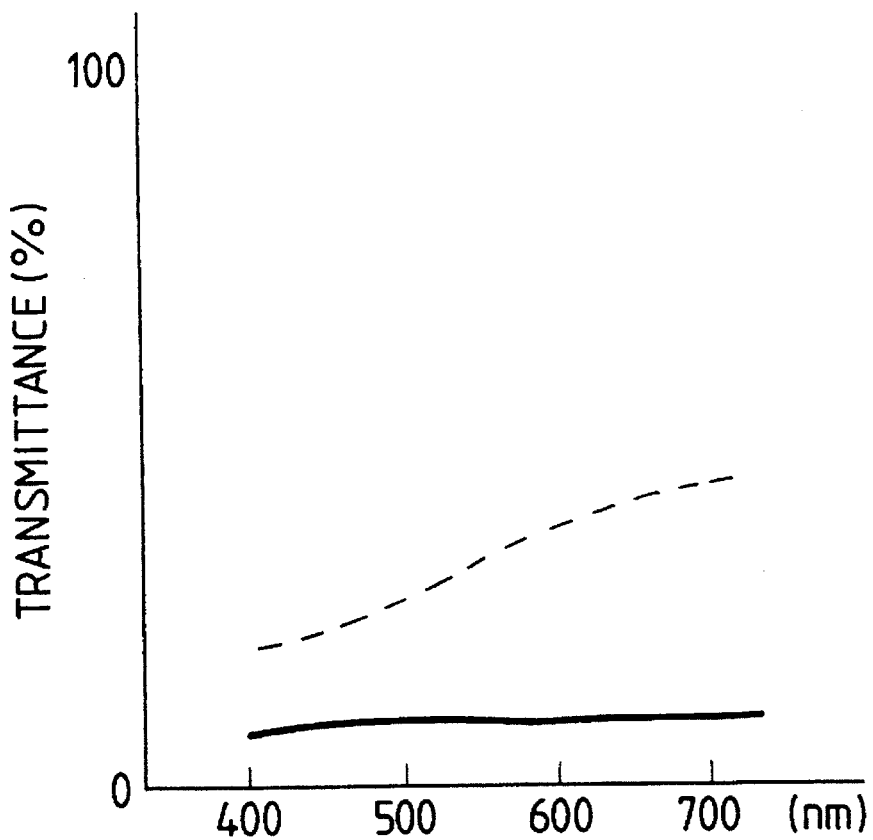
FIG. 25 is a chart showing transmission spectrum of the printed article of the reference example 4 in the colored opaque state and in the uncolored transparent state.
Figure 26:
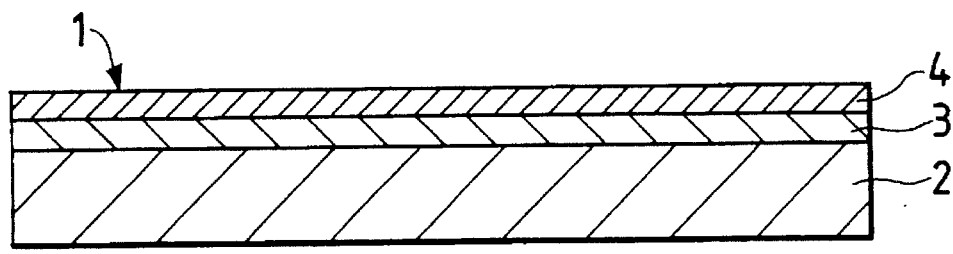
FIG. 26 is a magnified cross-sectional view of an embodiment of the laminate member of the present invention.

The color change curve of said printed article, the absorbance and transmittance in the colored opaque state and in the uncolored transparent state are respectively shown in FIGS. 23, 24 and 25.

REFERENCE EXAMPLE 5

A laminate member was prepared in the same manner as in the example 7, except that Acrylpet VK in the undercoat ink (a) therein was replaced by Paraloid B-66 (thermoplastic acrylic resin in 50% toluene solution, with glass transition point of 50° C., manufactured by Rohm and Haas Japan Co., Ltd.). The prepared laminate member scarcely developed color when cooled below 15° C., thus lacking change in color. This is presumably due to a fact that, at the coating of the thermochromic opaque/transparent ink (A), the solvent thereof redissolved the acrylic resin in the undercoat layer, whereby the thermochromic opaque/transparent composition was mixed with Paraloid B-66 and said acrylic resin permanently desensitized said composition.

REFERENCE EXAMPLE 6

A laminate member was prepared in the same manner as in the example 8, except that the topcoat ink (d) was replaced by the following topcoat ink, which was prepared by dissolving 10 parts of Dianal BR-83 (methyl methacrylate resin, manufactured by Mitsubishi Rayon Co., Ltd.) and 1 part of Tinuvin PS (ultraviolet absorbing agent, manufactured by Ciba-Geigy) in 60 parts of MIBK and 30 parts of cyclohexanone.

Thus prepared laminate member scarcely developed color even when cooled below 5° C., thus being poor in color change. This is presumably due to a fact that, at the coating of the topcoat ink, the thermochromic opaque/transparent ink was re-dissolved and the resin in the topcoat ink permanently desensitized the thermochromic composition. However it only showed the change in transparent/opaque states, with trigger temperature similar to those in the example 8.

REFERENCE EXAMPLE 7

In the system in which the SANOL LS770 is not blended in the example 1, remaining color was seen in the uncolored state in the time test at 60° C. for a week.

REFERENCE EXAMPLE 8

In the system in which epoxidized ester (vinyl chloride stabilizer) is blended in place of the SANOL LS770 in the example 1, no variations were observed in the time test at 60° C. for a week. However, after the lapse of ten days in the colored state at room temperature, strong remaining color occurred in the uncolored state.

REFERENCE EXAMPLE 9

When LA-8372 (phosphate stabilizer) is blended in place of the Tinuvin 944LD in the example 2, a result similar to that of the reference example 8 was shown.

REFERENCE EXAMPLE 10

When calcium laurate (vinyl chloride stabilizer) is blended in place of the Tinuvin 944LD in the example 2, the coloring density decreased to about 50% of that in the example 2, and great remaining color was seen in the uncolored state in the time test at 60° C. for 1 week.

EFFECT OF THE INVENTION

As explained in the foregoing, the thermochromic opaque/transparent composition of the present invention is composed of dispersion, in small particles in vinyl chloride-vinyl acetate copolymer matrix resin, which has been obtained by blending with hindered amine compound selected from piperidine derivatives within a particle size range of 0.1 to 2.0 µm, of a reversible thermochromic material consisting of (a) an electron-donating color-developing organic compound, (b) a compound having a phenolic hydroxyl radical, and (c) a uniform, mutually dissolved solution containing a compound selected from alcohols, esters, ketones and carboxylic acids, and is capable of showing reversible change in transparency, together with change in color, in response to temperature variation, with hysteresis with a temperature difference of 10° C. to 50° C. between the high and low trigger temperatures.

Dispersion as extremely small particles of 0.1 to 2.0 µm in the vinyl chloride-vinyl acetate copolymer matrix resin provides a particular effect that the thermochromic opaque/transparent composition can exist extremely stably, and in addition, exhibits stable, normal thermochromic function for a long period of time by blending with the hindered amine compound, whereby a practically acceptable composition can be provided. The thermochromic opaque/transparent composition of the present invention is based on the stability achieved by such microparticulate dispersion, and is also featured by hysteresis based on said microparticular dispersion.

Said composition of the present invention, particularly when laminated on a three-dimensional transparent article, provides a particular effect of revealing the interior of said three-dimensional article, by the changes in color and in transparency in response to temperature variation. In particular, the composition of the present invention exhibits a vivid change in color, thus being capable of causing a change between a colored opaque state and an uncolored transparent state, or between a colored (A) opaque state and a colored (B) transparent state and also shows hysteresis in said change, so that either of the colored opaque state and the uncolored transparent state can be retained in a region between the low and high trigger temperatures. The changes in thermochromic property and in transparency, achievable in the present invention, are particularly effective in the field of toys. It is thus rendered possible to conceal an internal object positioned inside a three-dimensional article and to reveal said internal object by a temperature variation. The obtained state can be semi-permanently retained within a predetermined temperature range. Another state can be resumed by bringing the temperature below the low trigger temperature or above the high trigger temperature, in reversible and repetitive manner. In the above-mentioned configuration, the thermochromic material is free from light scattering since it is not in the form of microcapsules, so that there can be clearly seen the underlying layer showing various optical properties such as the lustre, lustrous reflectance, optical interference, holographic property, metallic lustre, fluorescence etc. This is a unique effect, no attainable in the proper art, and applicable to toy, dolls, interior goods, printed matters, fabrics, wall papers, packaging materials, household goods, decorative goods etc.

It is also applicable to a recording material. Regardless whether the substrate is transparent or opaque, the thermochromic opaque/transparent composition, laminated on a two-dimensional substrate, can be used as a recording material. When laminated on a transparent film, it can be printed or written with a hot pen, a cold pen or a thermal head. Because of the aforementioned hysteresis, the printed or written pattern can be retained within the predetermined temperature range, and the recording and erasure can be repeated as desired. Consequently the composition of the present invention has wide applications as a recording medium, or as erasable board.

What is claimed is:

1. A thermochromic opaque/transparent composition wherein a reversible thermochromic material having a particle size in the range of from 0.1 to 2.0 μm and which is a homogeneous fused composition comprising (a) an electron-donating color-developing organic compound, (b) a compound having a phenolic hydroxyl radical, and (c) a compound selected from the group consisting of alcohols, esters, ketones and carboxylic acids, is dispersed and fixed in a vinyl chloride-vinyl acetate copolymer matrix resin in which at least one piperidine derivative has been blended, said matrix resin having an average molecular weight within a range from 7,000 to 50,000 and constituent monomer ratios of vinyl chloride within a range of 60 to 92% and vinyl acetate within a range of 8 to 40%, said thermochromic opaque/transparent composition being capable of exhibiting reversible change in transparency together with change in color in response to temperature variation to exhibit a transparent state in a temperature range above a high trigger temperature and a colored opaque state in a temperature range below a low trigger temperature with a hysteresis having a temperature difference of 10° C. to 50° C., both states being selectively held in a temperature range between said low and high trigger temperatures.

2. A thermochromic opaque/transparent composition according to claim 1, composed with a ratio, with respect to 100 parts by weight of the vinyl chloride vinyl acetate copolymer resin, of hindered amine compound selected from piperidine derivatives within a range of 0.1 to 10 parts by weight, (a) electron-donating color-developing organic compound within a range of 0.8 to 33 parts by weight, (b) compound having a phenolic hydroxyl radical within a range of 1.6 to 50 parts by weight, and (c) compound selected from alcohols, esters, ketones and carboxylic acids within a range of 8 to 83 parts by weight.

3. A thermochromic opaque/transparent composition according to claim 1, further comprising, with respect to 100 parts by weight of said composition, a dispersing agent in a ratio of 0.002 to 0.5 parts by weight.

4. A thermochromic opaque/transparent composition according to claim 1, wherein at least 50 wt. % of the compound having phenolic hydroxyl radical is selected from the compound represented by the following general formula:

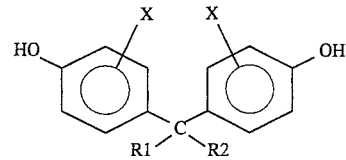

wherein R1 stands for H or $CH_3$, R2 stands for $C_nH_{2n+1}$ (4<n<11), which is a straight-chain or branched chain alkyl radical, or R1=R2=$CF_3$, and X stands for a substituent which is H or $CH_3$ on the aromatic ring.

5. A thermochromic opaque/transparent composition according to claim 1, wherein said component (c) is one or more esters selected from (a) esters each consisting of a monobasic fatty acid and an aliphatic or alicyclic monohydric alcohol and having 10 or more carbon atoms in total, (b) polybasic acid esters each consisting of an aliphatic di- or polybasic carboxylic acid and an aliphatic or alicyclic monohydric alcohol and having 28 or more carbon atoms in total, (c) esters each consisting of an aliphatic di- or polyhydric alcohol and a monobasic fatty acid and having 26 or more carbon atoms in total, and (d) esters each consisting of an aromatic dihydric alcohol and a monobasic fatty acid and having 28 or more carbon atoms in total.

6. A laminate member, comprising a substrate bearing a laminated layer of the thermochromic opaque/transparent composition of claim 1.

7. A laminate member according to claim 6, wherein said substrate is a transparent substrate.

8. A laminate member according to claim 7, wherein said substrate is provided thereon with an undercoat layer constituting of methacrylic resin with the glass transition point at least equal to 80° C.

9. A laminate member according to claim 6, wherein the layer of the thermochromic opaque/transparent composition is provided thereon with a layer consisting of transparent methacrylic or acrylic resin or copolymer resin thereof, soluble in alcohol or aliphatic hydrocarbon.

10. A three-dimensional article capable of concealing or revealing the interior, of which at least a part is composed of the laminate member according to claim 6, whereby an object inside said article can be concealed or revealed in response to temperature variation.

11. A three-dimensional article capable of concealing or revealing the interior, of which at least a part is composed of the laminate member according to claim 7, whereby an object inside said article can be concealed or revealed in response to temperature variation.

12. A three-dimensional article capable of concealing or revealing the interior, of which at least a part is composed of the laminate member according to claim 8, whereby an object inside said article can be concealed or revealed in response to temperature variation.

13. A three-dimensional article capable of concealing or revealing the interior, of which at least a part is composed of the laminate member according to claim 9, whereby an object inside said article can be concealed or revealed in response to temperature variation.

14. A three-dimensional article according to claim 10, which is a toy, a stationary article or a teaching aid.

* * * * *

UNITED STATES PATENT AND TRADEMARK OFFICE
CERTIFICATE OF CORRECTION

PATENT NO. : 5,585,425

DATED : December 17, 1996

INVENTOR(S): TSUTOMU KITO ET AL.

It is certified that error appears in the above-identified patent and that said Letters Patent is hereby corrected as shown below:

Title page, item
[57] ABSTRACT

Line 8, "chloridevinyl" should read --chloride-vinyl--.

COLUMN 1

Line 43, "in" should read --into--.

COLUMN 2

Line 11, "in case" should read --in the case where--.
    Line 17, "in" should read --in a--.

COLUMN 4

Line 26, "In" should read --in--.
    Line 52, "time" should read --time,--.
    Line 56, "on" should read --of--.
    Line 58, "mentioned before," should read --mentioned,--.

COLUMN 5

Line 66, "electron donating" should read --electron-donating--.

UNITED STATES PATENT AND TRADEMARK OFFICE
CERTIFICATE OF CORRECTION

PATENT NO. : 5,585,425

DATED : December 17, 1996

INVENTOR(S) : TSUTOMU KITO ET AL.

It is certified that error appears in the above-identified patent and that said Letters Patent is hereby corrected as shown below:

COLUMN 6

Line 16, "xylindinofluorane," should read
        --xylidinofluorane,--.
    Line 32, "electro-donating" should read
        --electron-donating--.
    Line 37, "2,2- bis(4'-" should read --2-2-bis(4'- --.
    Line 39, "1,1-bis(4-hydroxyphenyl)ethane," should read
        --1,1-bis(4'-hydroxyphenyl)ethane,--.

COLUMN 7

Line 61, "irate, neopentyl palmirate," should read
        --itate, neopentyl palmitate,--.
    Line 62, "palmirate," should read --palmitate,--.
    Line 63, "irate," should read --itate,--.

COLUMN 9

Line 41, "blended." should read --blended in.--.

COLUMN 10

Line 49, "(1,2,2,6,6-pentametyl-4-piperi-" should read
        --(1,2,2,6,6,-pentamethyl-4-piperi- --.
    Line 60, "2,2,4,4-tetrametyl-20-(ß-" should read
        --2,2,4,4-tetramethyl-20-(ß- --.

UNITED STATES PATENT AND TRADEMARK OFFICE
CERTIFICATE OF CORRECTION

PATENT NO. : 5,585,425
DATED : December 17, 1996
INVENTOR(S) : TSUTOMU KITO ET AL.

It is certified that error appears in the above-identified patent and that said Letters Patent is hereby corrected as shown below:

COLUMN 11

Line 8, "explained before," should read --explained,--.

COLUMN 14

Line 27, "stationary" should read --stationery--.
Line 36, "to maintain" should read --the maintaining of--.
Line 52, "to clearly see" should read --clearly seeing--.

COLUMN 16

Line 22, "details" should read --detail--.

COLUMN 18

Line 8, "2,2-bis(4'-hy-" should read --2,2-bis(4-hy- --.

COLUMN 22

Line 12, "while became" should read --while below said low trigger temperature the article--.
Line 19, "[1]Ink" should read --[1] Ink--.
Line 33, "[2]Preparation" should read --[2] Preparation--.

UNITED STATES PATENT AND TRADEMARK OFFICE
CERTIFICATE OF CORRECTION

PATENT NO. : 5,585,425

DATED : December 17, 1996

INVENTOR(S) : TSUTOMU KITO ET AL.

Page 4 of 5

It is certified that error appears in the above-identified patent and that said Letters Patent is hereby corrected as shown below:

COLUMN 24

Line 8, "temperature" should read --temperatures--.
    Line 13, "in" (first occurrence) should read --as in--.
    Line 19, "in" (first occurrence) should read --as in--.
    Line 26, "in" should read --as in--.
    Line 33, "in" (first occurrence) should read --as in--.

COLUMN 25

Line 28, "no" should read --not--.
    Line 29, "toy," should read --toys,--.

COLUMN 26

Line 5, "chloride vinyl" should read --chloride-vinyl--.
    Line 53, "con-" should be deleted.
    Line 54, "stituting of" should read --comprising--, and "the" should read --a--.
    Line 55, "at least equal to" should read --of at least--.

UNITED STATES PATENT AND TRADEMARK OFFICE
CERTIFICATE OF CORRECTION

PATENT NO.  : 5,585,425

DATED       : December 17, 1996

INVENTOR(S) : TSUTOMU KITO ET AL.

It is certified that error appears in the above-identified patent and that said Letters Patent is hereby corrected as shown below:

<u>COLUMN 28</u>

Line 7, "stationary" should read --stationery--.

Signed and Sealed this

Twenty-ninth Day of July, 1997

Attest:

BRUCE LEHMAN

Attesting Officer        Commissioner of Patents and Trademarks